United States Patent
Cha et al.

(10) Patent No.: US 11,502,735 B2
(45) Date of Patent: Nov. 15, 2022

(54) METHOD FOR TRANSMITTING AND RECEIVING DOWNLINK SIGNAL AND DEVICE FOR SAME

(71) Applicant: LG ELECTRONICS INC., Seoul (KR)

(72) Inventors: Hyunsu Cha, Seoul (KR); Jiwon Kang, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 17/266,986

(22) PCT Filed: Aug. 7, 2019

(86) PCT No.: PCT/KR2019/009865
§ 371 (c)(1),
(2) Date: Feb. 8, 2021

(87) PCT Pub. No.: WO2020/032569
PCT Pub. Date: Feb. 13, 2020

(65) Prior Publication Data
US 2021/0314045 A1 Oct. 7, 2021

Related U.S. Application Data

(60) Provisional application No. 62/717,766, filed on Aug. 10, 2018.

(51) Int. Cl.
*H04W 16/28* (2009.01)
*H04B 7/06* (2006.01)
(Continued)

(52) U.S. Cl.
CPC ......... *H04B 7/0626* (2013.01); *H04B 7/0617* (2013.01); *H04L 5/0051* (2013.01);
(Continued)

(58) Field of Classification Search
CPC ... H04B 7/0626; H04B 7/0617; H04W 16/28; H04W 72/046
See application file for complete search history.

(56) References Cited

U.S. PATENT DOCUMENTS 10,834,719 B2 * 11/2020 Sasaki .................. H04L 5/0012
2018/0092129 A1 * 3/2018 Guo .................. H04W 56/0005
(Continued)

FOREIGN PATENT DOCUMENTS

WO 2017039166 3/2017

OTHER PUBLICATIONS

Title: Remaining details of beam management; Source: Ericsson; R1-1721366 Reno, USA, Nov. 27-Dec. 1, 2017 (Year: 2017).*
(Continued)

*Primary Examiner* — Fahmida S Chowdhury
(74) *Attorney, Agent, or Firm* — Lee Hong Degerman Kang & Waimey

(57) ABSTRACT

The present invention relates to a method for a terminal to receive a downlink signal in a wireless communication system, the method including: receiving information for providing notification of a mode related to the repetitive use of a beam for a channel state information-reference signal (CSI-RS); receiving a transmission configuration indication (TCI) for a physical downlink shared channel (PDSCH); and receiving the CSI-RS and the PDSCH through at least one identical orthogonal frequency division multiplexing (OFDM) symbol on the basis of the information and the TCI, wherein the TCI may include at least one CSI-RS resource identification (ID).

11 Claims, 34 Drawing Sheets

(51) Int. Cl.
*H04W 76/11* (2018.01)
*H04L 5/00* (2006.01)
*H04W 72/04* (2009.01)

(52) U.S. Cl.
CPC ......... *H04W 16/28* (2013.01); *H04W 72/046* (2013.01); *H04W 76/11* (2018.02)

(56) References Cited

U.S. PATENT DOCUMENTS

| | | | |
|---|---|---|---|
| 2018/0302889 A1* | 10/2018 | Guo | H04B 7/088 |
| 2018/0343089 A1* | 11/2018 | Park | H04L 5/005 |
| 2019/0230685 A1* | 7/2019 | Park | H04L 1/1864 |
| 2020/0221428 A1* | 7/2020 | Moon | H04B 7/024 |
| 2021/0045003 A1* | 2/2021 | Li | H04W 24/02 |
| 2021/0058130 A1* | 2/2021 | Zhu | H04W 74/0833 |

OTHER PUBLICATIONS

Title: CSI-RS and SSB L1 RSRP for beam management; Source: Nokia, Nokia Shanghai Bell Montreal, Canada, Jul. 2-6, 2018. (Year: 2018).*
PCT International Application No. PCT/KR2019/009865, International Search Report dated Dec. 3, 2019, 17 pages.
Ericsson, "Remaining details of beam management," R1-1721366, 3GPP TSG-RAN WG1 #91, Dec. 2017, 15 pages.
Nokia et al., "CSI-RS and SSB L1 RSRP for beam management," R4-1809082, 3GPP TSG-RAN WG4 Meeting—AH-1807, Jul. 2018, 7 pages.
Nokia et al., "Offline discussion summary on QCL," R1-1805690, 3GPP TSG RAN WG1#92bis, Apr. 2018, 22 pages.
Qualcomm Incorporated, "Remaining Details on QCL," R1-1807351, 3GPP TSG-RAN WG1 Meeting #93, May 2018, 12 pages.

* cited by examiner (A) CONTROL-PLANE PROTOCOL STACK (B) USER-PLANE PROTOCOL STACK (a)  (b)

(a)

(b)

METHOD FOR TRANSMITTING AND RECEIVING DOWNLINK SIGNAL AND DEVICE FOR SAME

CROSS-REFERENCE TO RELATED APPLICATIONS

This application is the National Stage filing under 35 U.S.C. 371 of International Application No. PCT/KR2019/009865, filed on Aug. 7, 2019, which claims the benefit of U.S. Provisional Application No. 62/717,766, filed on Aug. 10, 2018, the contents of which is incorporated by reference herein in its entirety.

TECHNICAL FIELD

The present disclosure relates to a method of transmitting and receiving a downlink signal and device therefor and, more particularly, to a method of a downlink signal such as a channel state information reference signal (CSI-RS), synchronization signal/physical broadcast channel (SS/PBCH) block, physical downlink control channel (PDCCH), physical downlink shared channel (PDSCH), channel state information interference measurement (CSI-IM), etc. and device therefor.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

The object of the present disclosure is to provide a method of transmitting and receiving a downlink signal and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of receiving a downlink signal by a user equipment (UE) in a wireless communication system is provided. The method may include: receiving information informing a mode related to repeating a beam for a channel state information reference signal (CSI-RS); receiving a transmission configuration indication (TCI) for a physical downlink shared channel (PDSCH); and receiving the CSI-RS and the PDSCH in at least one same orthogonal frequency division multiplexing (OFDM) symbol based on the information and the TCI. The TCI may include at least one CSI-RS resource identification (ID).

The mode related to repeating a beam is set to 'OFF'.

The at least one CSI-RS resource ID is related to at least one CSI-RS resource included in a CSI-RS resource set associated with the mode related to repeating a beam.

The PDSCH is received based on a reception beam for receiving a CSI-RS resource related to the at least one CSI-RS resource ID.

The mode related to repeating a beam is related to no beam sweeping performed by the UE.

The UE may communicate with at least one of a UE other than the UE, a base station, a network, or an autonomous driving vehicle.

In another aspect of the present disclosure, a device for receiving a downlink signal in a wireless communication system is provided. The device may include: at least one processor; and at least one memory operably connectable to the at least one processor and storing instructions that, when executed, cause the at least one processor to perform operations comprising: receiving information informing a mode related to repeating a beam for a channel state information reference signal (CSI-RS); receiving a transmission configuration indication (TCI) for a physical downlink shared channel (PDSCH); and receiving the CSI-RS and the PDSCH in at least one same orthogonal frequency division multiplexing (OFDM) symbol based on the information and the TCI. The TCI may include at least one CSI-RS resource identification (ID).

The mode related to repeating a beam is set to 'OFF'.

The at least one CSI-RS resource ID is related to at least one CSI-RS resource included in a CSI-RS resource set associated with the mode related to repeating a beam.

The PDSCH is received based on a reception beam for receiving a CSI-RS resource related to the at least one CSI-RS resource ID.

The mode related to repeating a beam is related to no beam sweeping performed by the UE.

The device may communicate with at least one of a UE, a base station, a network, or an autonomous driving vehicle.

In a further aspect of the present disclosure, a UE for receiving a downlink signal in a wireless communication system is provided. The UE may include: at least one transceiver; at least one processor; and at least one memory operably connectable to the at least one processor and storing instructions that, when executed, cause the at least one processor to perform operations comprising: receiving information informing a mode related to repeating a beam for a channel state information reference signal (CSI-RS); receiving a transmission configuration indication (TCI) for a physical downlink shared channel (PDSCH); and receiving the CSI-RS and the PDSCH in at least one same orthogonal frequency division multiplexing (OFDM) symbol based on the information and the TCI. The TCI may include at least one CSI-RS resource identification (ID).

Advantageous Effects

According to the present disclosure, two or more downlink signals with different types may be efficiently transmitted and received.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
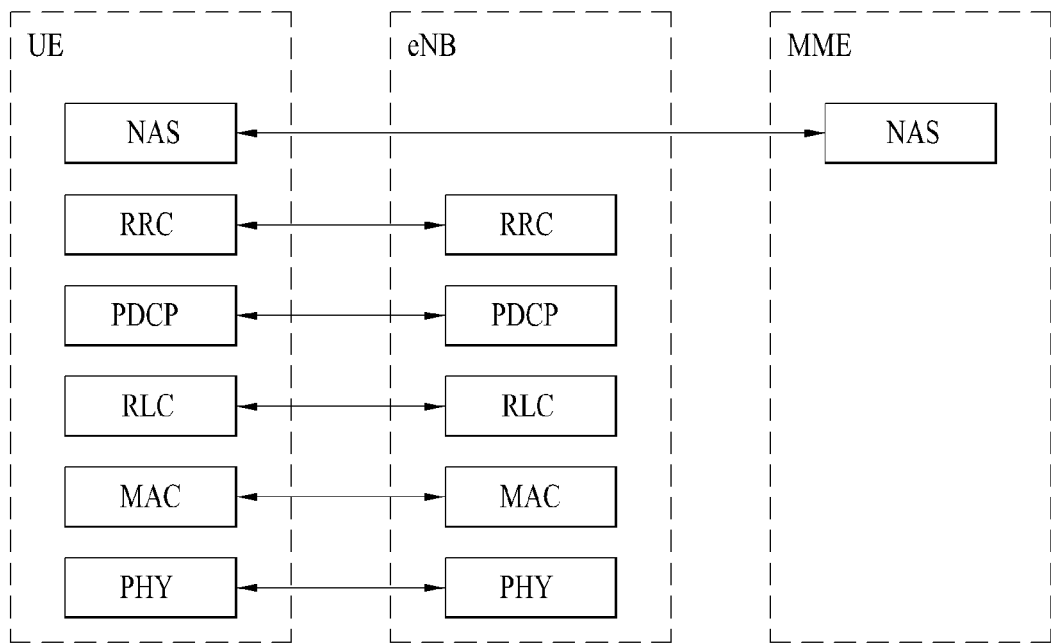
FIG. 1 is a diagram illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.
Figure 1:
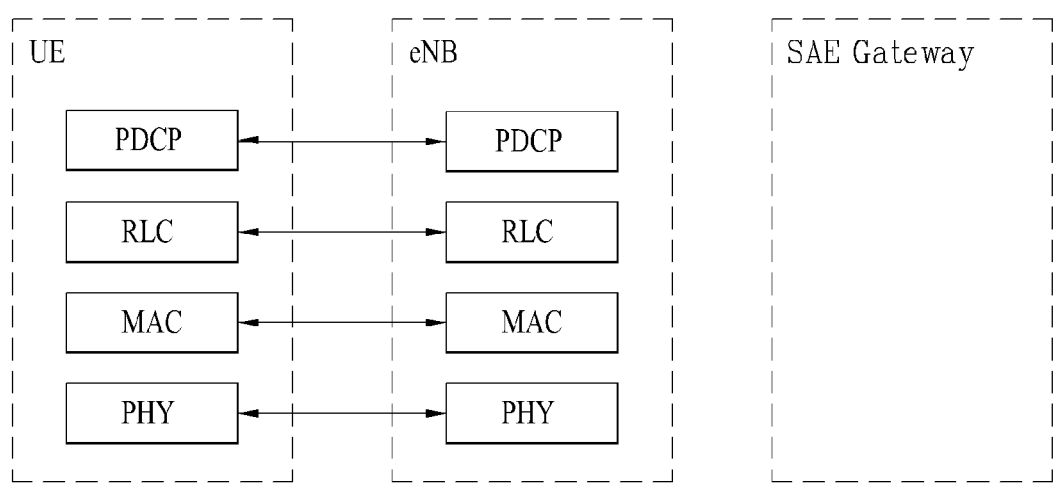

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

<Artificial Intelligence (AI)>

AI refers to the field of studying AI or methodology for making the same, and machine learning refers to the field of defining various issues dealt with in the AI field and studying methodology for solving the various issues. The machine learning is defined as an algorithm that enhances the performance of a certain task through consistent experiences with the task.

An artificial neural network (ANN) is a model used in the machine learning and may mean a whole model of problem-solving ability which is composed of artificial neurons (nodes) that form a network by synaptic connections. The ANN may be defined by a connection pattern between neurons in different layers, a learning process for updating model parameters, and an activation function for generating an output value.

The ANN may include an input layer, an output layer, and optionally one or more hidden layers. Each layer includes one or more neurons, and the ANN may include a synapse that links neurons. In the ANN, each neuron may output the function value of the activation function for input signals, weights, and bias input through the synapse.

The model parameter refers to a parameter determined through learning and includes the weight value of a synaptic connection and the bias of a neuron. A hyperparameter means a parameter to be set in the machine learning algorithm before learning and includes a learning rate, a repetition number, a mini-batch size, and an initialization function.

The purpose of the learning of the ANN may be to determine the model parameter that minimizes a loss function. The loss function may be used as an index to determine the optimal model parameter in the learning process of the ANN.

Machine learning may be classified into supervised learning, unsupervised learning, and reinforcement learning according to learning mechanisms.

The supervised learning may refer to a method of training the ANN in a state that labels for learning data are given, and the label may mean a correct answer (or result value) that the ANN must infer when the learning data is input to the ANN. The unsupervised learning may refer to a method of training the ANN in a state that labels for learning data are not given. The reinforcement learning may refer to a method of learning an agent defined in a certain environment to select a behavior or a behavior sequence that maximizes cumulative compensation in each state.

Machine learning implemented with a deep neural network (DNN) including a plurality of hidden layers among ANNs is referred to as deep learning. The deep running is part of the machine running. The machine learning used herein includes the deep running.

<Robot>

A robot may refer to a machine that automatically processes or operates a given task based on its own ability. In particular, a robot having a function of recognizing an environment and making a self-determination may be referred to as an intelligent robot.

Robots may be classified into industrial robots, medical robots, home robots, military robots, etc. according to use purposes or fields.

The robot may include a driving unit having an actuator or a motor and perform various physical operations such as moving a robot joint. In addition, a movable robot may include a driving unit having a wheel, a brake, a propeller, etc. and may travel on the ground or fly in the air through the driving unit.

<Autonomous Driving (Self-driving)>

Autonomous driving refers to a technique of driving by itself. An autonomous driving vehicle refers to a vehicle moving with no user manipulation or with minimum user manipulation.

For example, the autonomous driving may include a technology for maintaining a current lane, a technology for automatically adjusting a speed such as adaptive cruise control, a technique for automatically moving along a predetermined route, and a technology for automatically setting a route and traveling along the route when a destination is determined.

The vehicle may include a vehicle having only an internal combustion engine, a hybrid vehicle having an internal combustion engine and an electric motor together, and an electric vehicle having only an electric motor. Further, the vehicle may include not only an automobile but also a train, a motorcycle, etc.

The autonomous driving vehicle may be regarded as a robot having the autonomous driving function.

<Extended Reality (XR)>

Extended reality is collectively referred to as virtual reality (VR), augmented reality (AR), and mixed reality (MR). The VR technology provides real-world objects and backgrounds as CG images, the AR technology provides virtual CG images on real object images, and the MR technology is a computer graphic technology of mixing and combining virtual objects with the real world.

The MR technology is similar to the AR technology in that real and virtual objects are shown together. However, the MR technology is different from the AR technology in that the AR technology uses virtual objects to complement real objects, whereas the MR technology deal with virtual and real objects in the same way.

The XR technology may be applied to a HMD, a head-up display (HUD), a mobile phone, a tablet PC, a laptop computer, a desktop computer, a TV, a digital signage, etc. A device to which the XR technology is applied may be referred to as an XR device.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
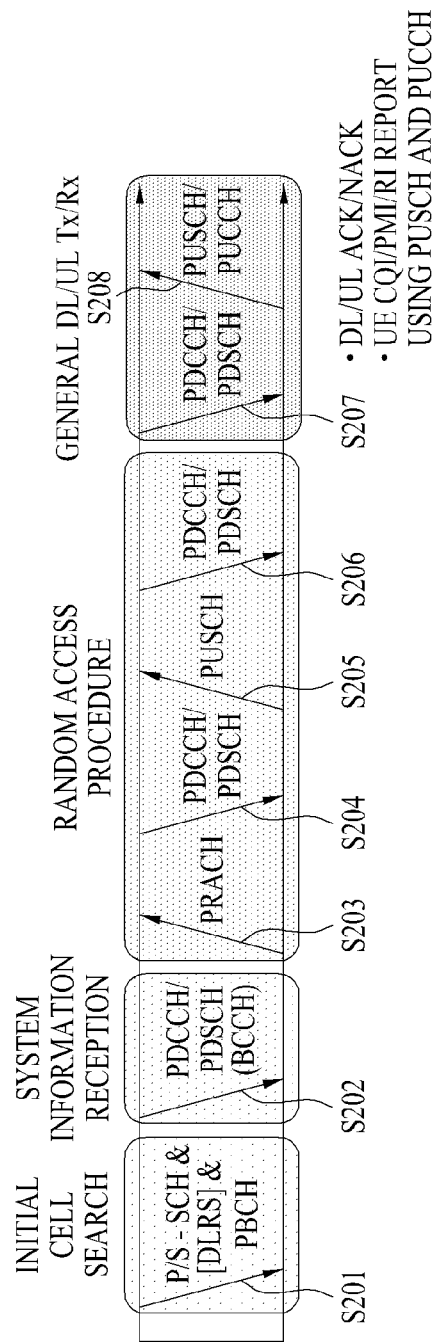
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
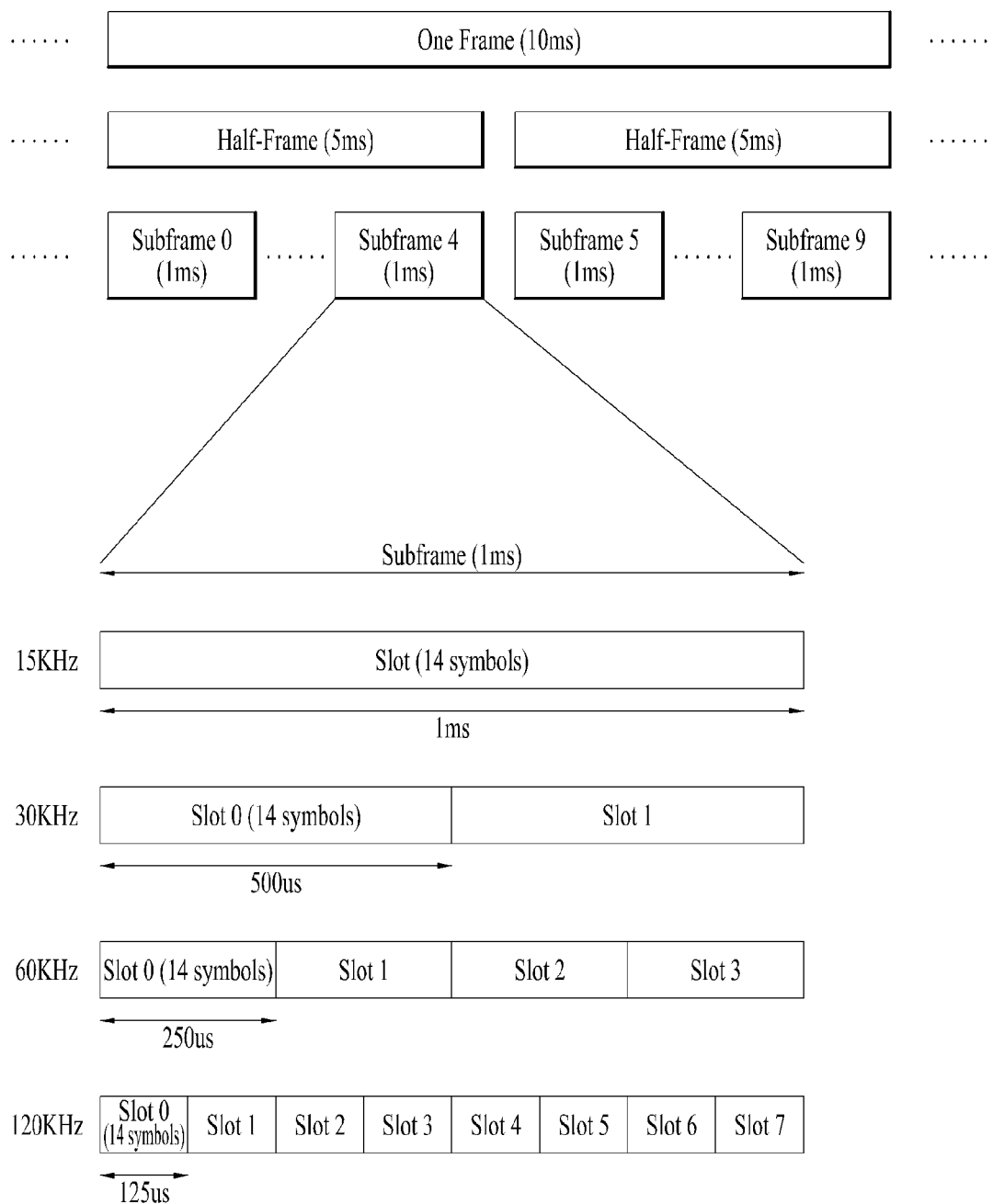
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame, u}_{slot}$: Number of slots in a frame
$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 4:
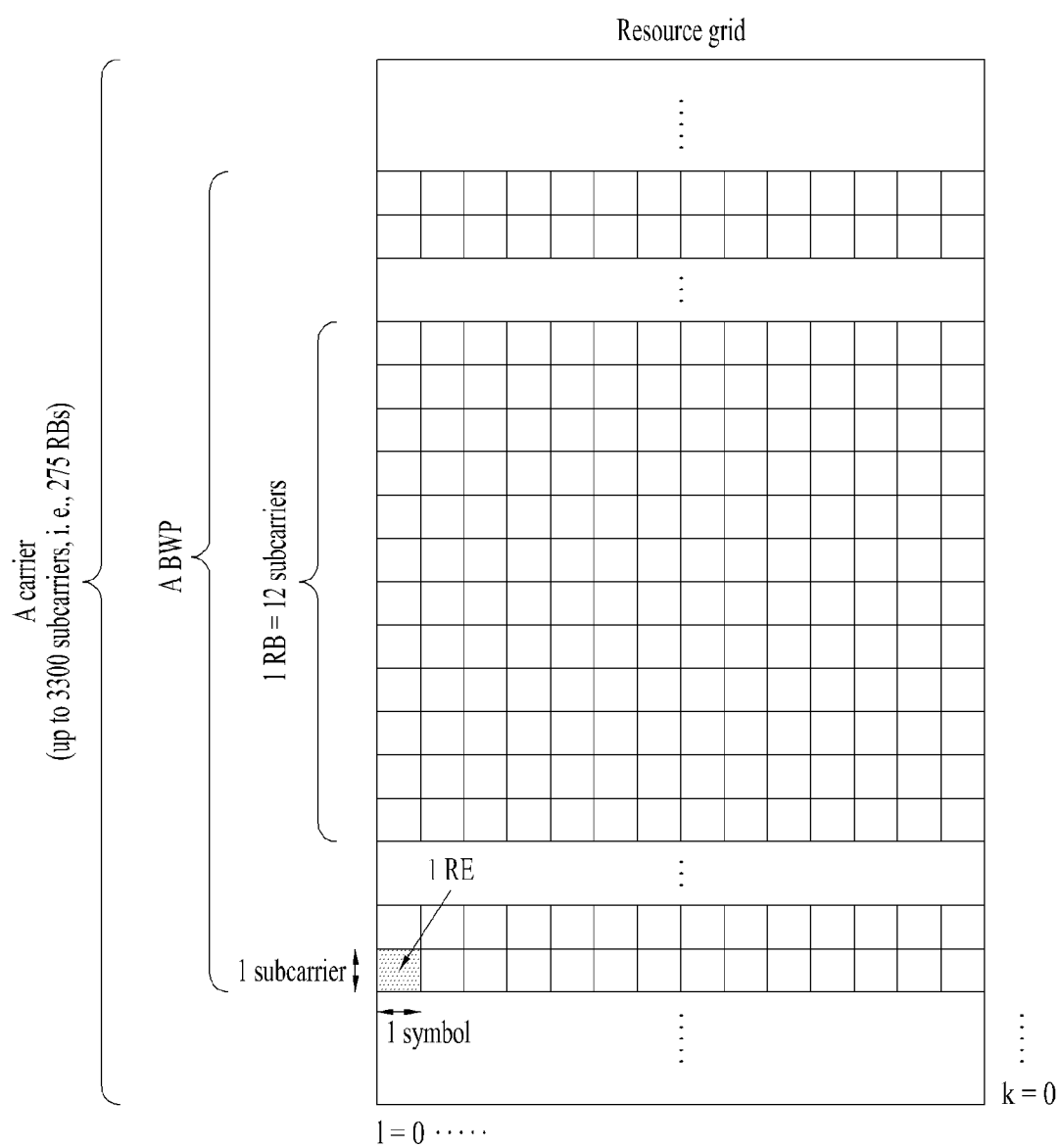

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
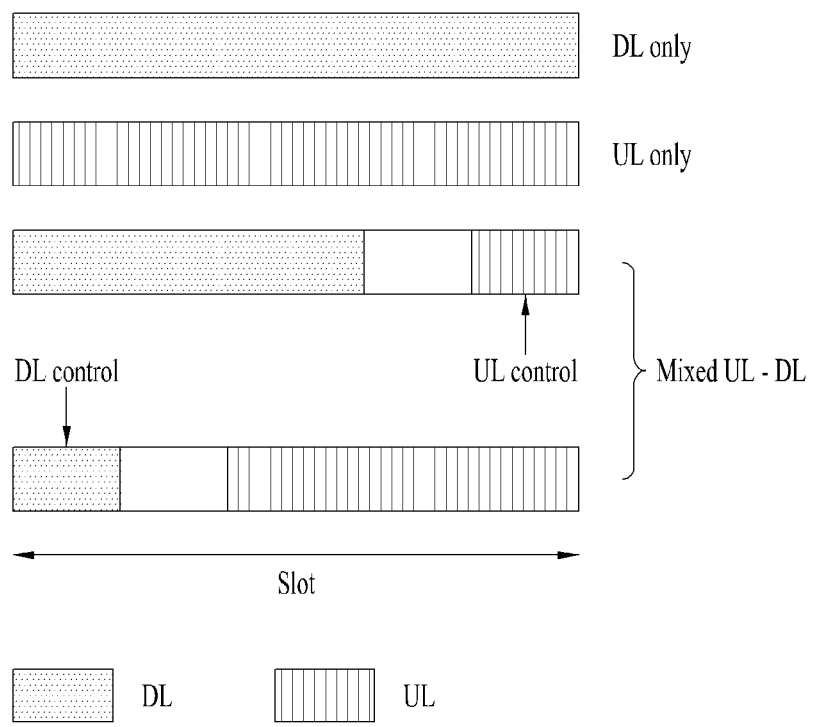

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
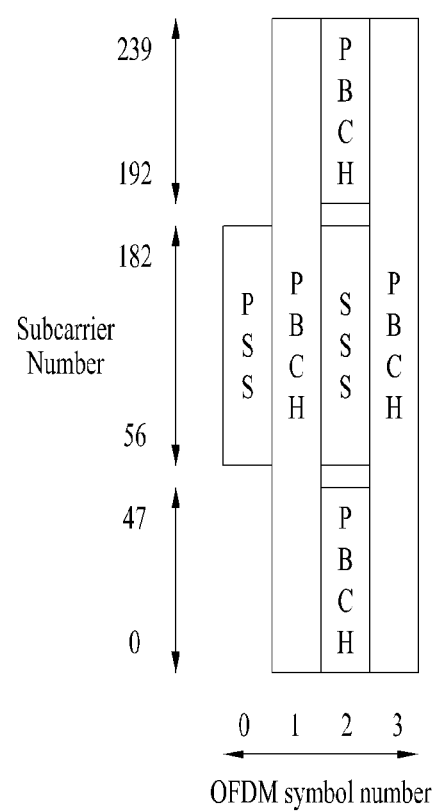
FIGS. 6, 7, 8, and 9 are diagrams illustrating the composition of a synchronization signal/physical broadcast channel (SS/PBCH) block and a method of transmitting an SS/PBCH block.

FIG. 6 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 6, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| Type of Signals | | Operations |
|---|---|---|
| 1st step | PSS | SS/PBCH block (SSB) symbol timing acquisition |
| | | Cell ID detection within a cell ID group (3 hypothesis) |

TABLE 3-continued

| Type of Signals | | Operations |
|---|---|---|
| 2$^{nd}$ Step | SSS | Cell ID group detection (336 hypothesis) |
| 3$^{rd}$ Step | PBCH DMRS | SSB index and Half frame (HF) index (Slot and frame boundary detection) |
| 4$^{th}$ Step | PBCH | Time information (80 ms, System Frame Number (SFN), SSB index, HF) Remaining Minimum System Information (RMSI) Control resource set (CORESET)/ Search space configuration |
| 5$^{th}$ Step | PDCCH and PDSCH | Cell access information RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 7:
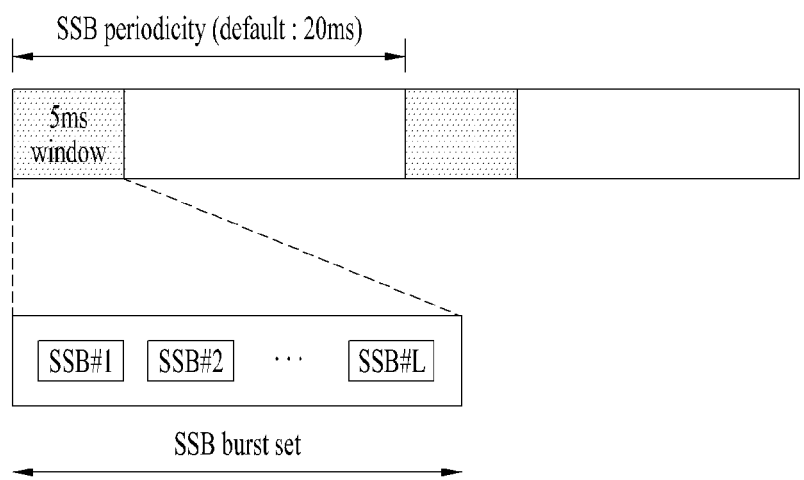

FIG. 7 illustrates SSB transmission. Referring to FIG. 7, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4

For frequency range from 3 GHz to 6 GHz, L=8

For frequency range from 6 GHz to 52.6 GHz, L=64

The time position of an SSB candidate in the SS burst set may be defined according to the SCS as follows. The time positions of SSB candidates are indexed as (SSB indexes) 0 to L-1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 8:
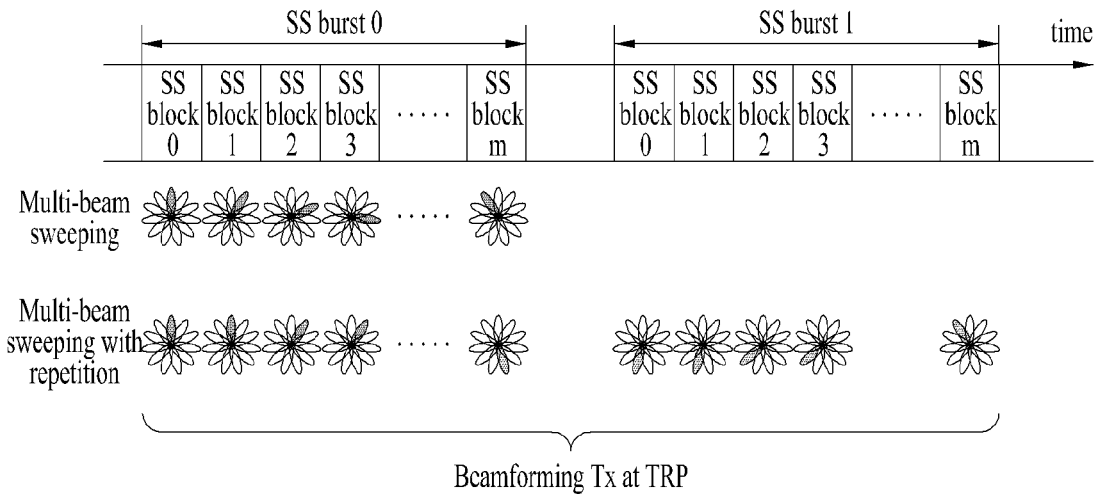

FIG. 8 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 8, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Figure 9:
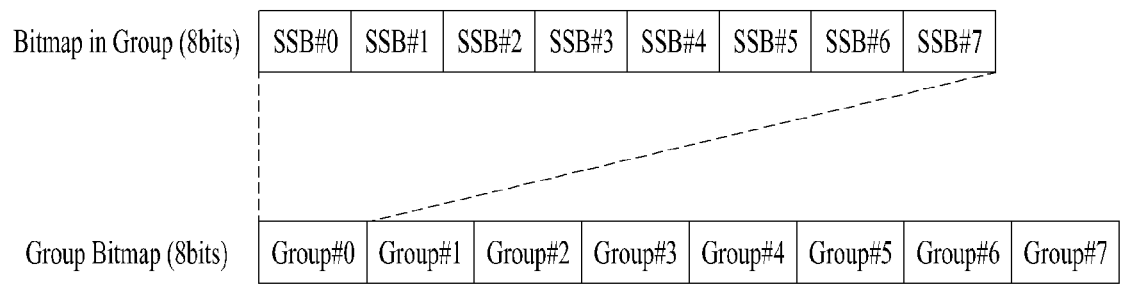

FIG. 9 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 10:
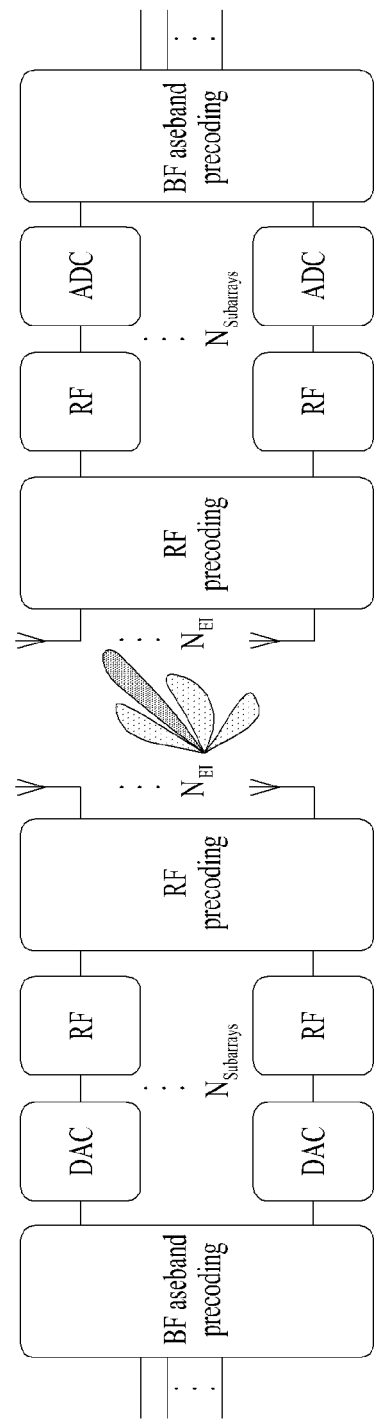
FIG. 10 is a diagram illustrating analog beamforming in the NR system.

FIG. 10 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Downlink Beam Management (DL BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using Tx beams and/or Rx beams in a predetermined manner during a predetermined time interval.

Beam report: the UE reports information about a beamformed signal based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 11:
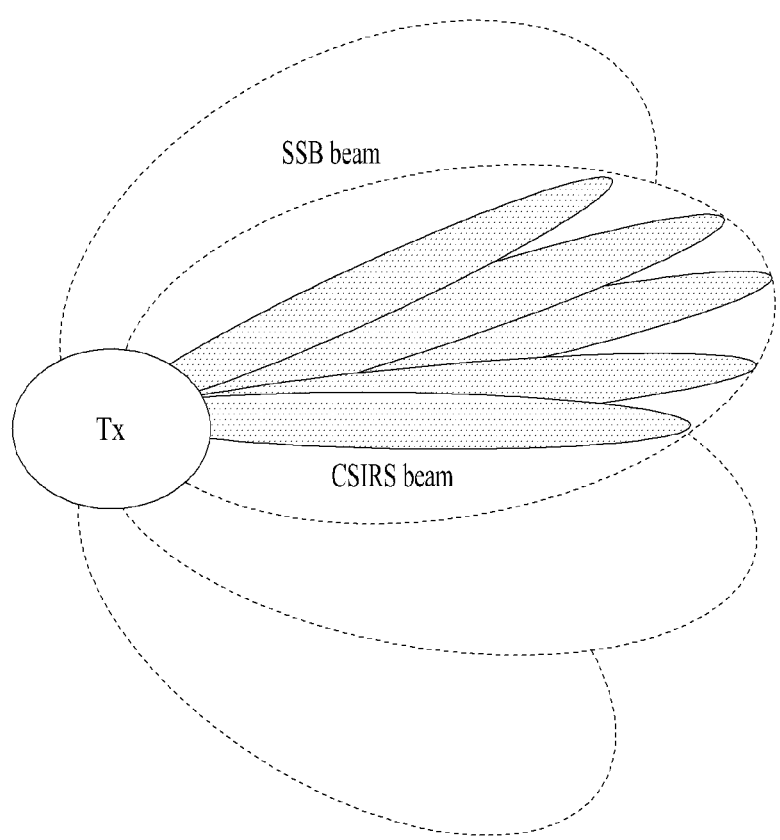
FIGS. 11, 12, 13, 14, and 15 are diagrams illustrating beam management in the NR system.

FIG. 11 is a diagram illustrating exemplary BF using an SSB and a CSI-RS.

Referring to FIG. 11, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts.

1. DL BM Using SSB

Figure 12:
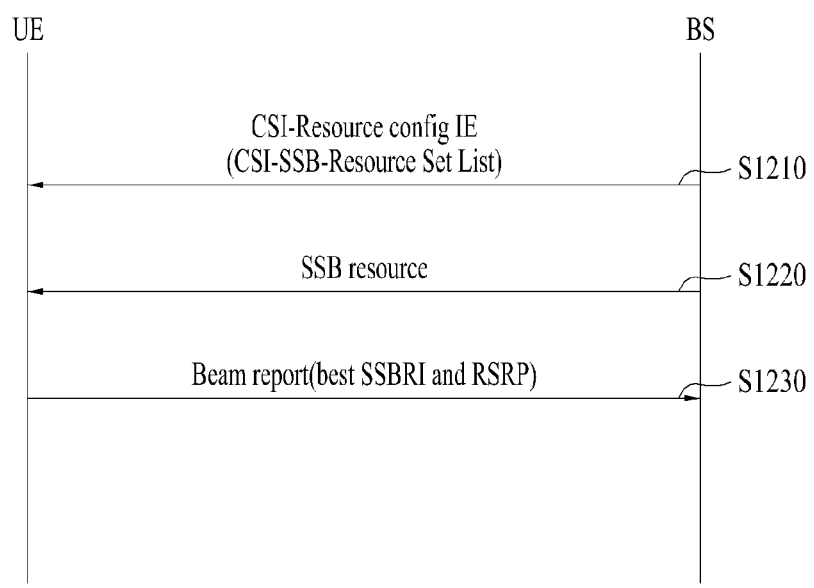

FIG. 12 is a diagram illustrating a signal flow for an exemplary DL BM process using an SSB.

An SSB-based beam report is configured during CSI/beam configuration in RRC_CONNECTED mode.

A UE receives a CSI-ResourceConfig information element (IE) including CSI-SSB-ResourceSetList for SSB resources used for BM from a BS (S1210). The RRC parameter, CSI-SSB-ResourceSetList is a list of SSB resources used for BM and reporting in one resource set. The SSB resource set may be configured as {SSBx1, SSBx2, SSBx3, SSBx4}. SSB indexes may range from 0 to 63.

The UE receives signals in the SSB resources from the BS based on CSI-SSB-ResourceSetList (S1220).

When CSI-RS reportConfig related to an SSBRI and RSRP reporting has been configured, the UE reports a best SSBRI and an RSRP corresponding to the best SSBRI to the BS (S1230). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

2. DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used for a tracking reference signal (TRS); and iii) when either of Repetition or TRS_info is configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

Figure 13:
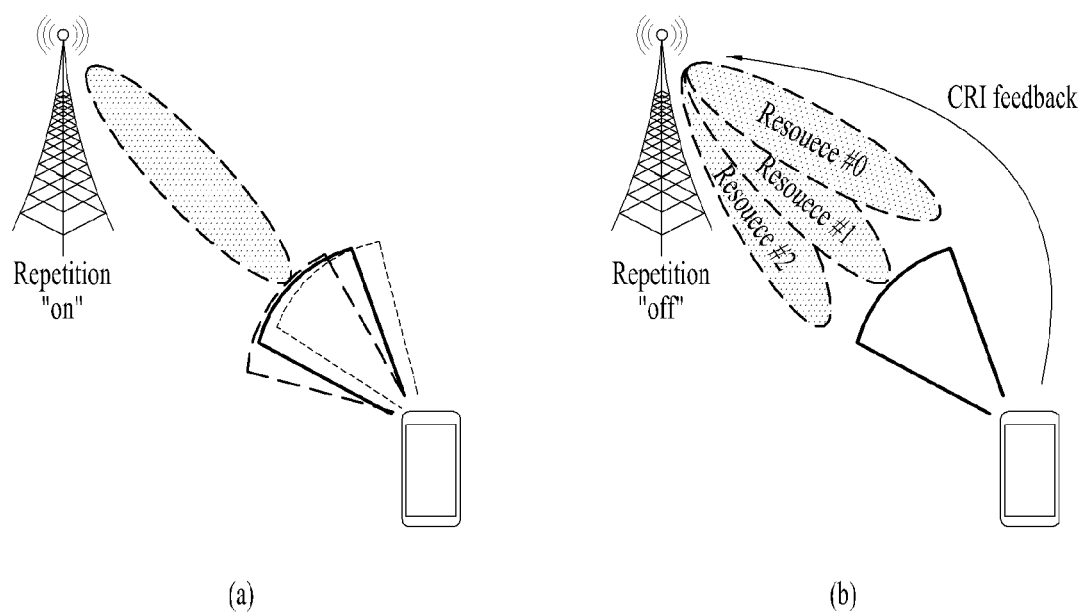

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 13 illustrates another exemplary DL BM process using a CSI-RS.

FIG. 13(a) illustrates an Rx beam refinement process of a UE, and FIG. 13(b) illustrates a Tx beam sweeping process of a BS. Further, FIG. 13(a) is for a case in which Repetition is set to 'ON', and FIG. 13(b) is for a case in which Repetition is set to 'OFF'.

Figure 14:
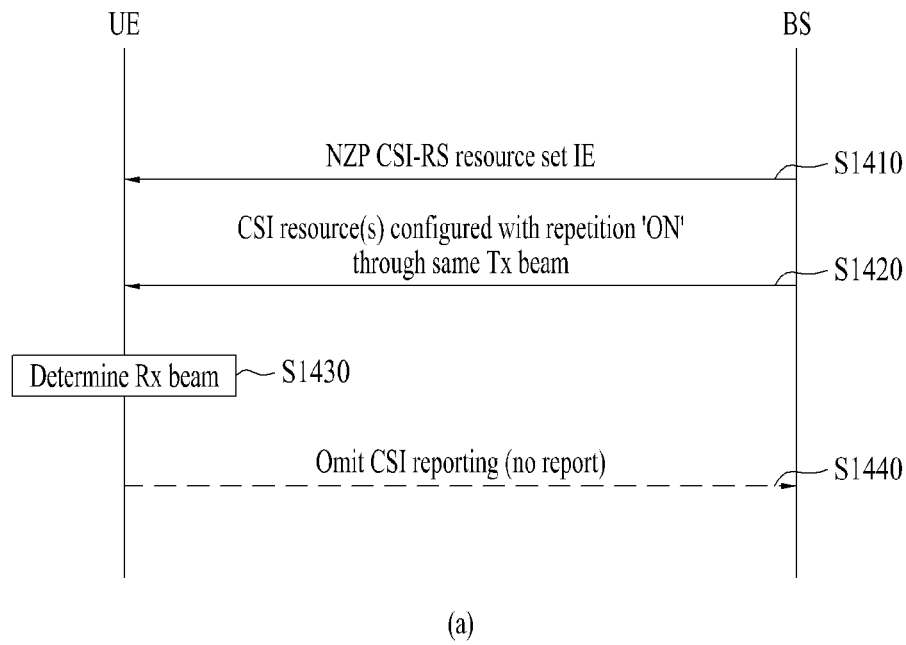
Figure 14:
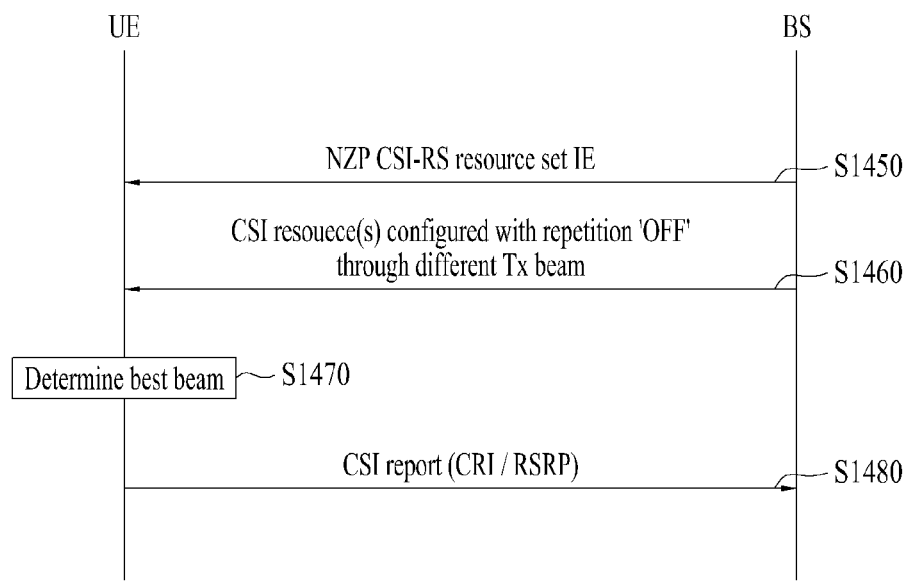

With reference to FIGS. 13(a) and 14(a), an Rx beam determination process of a UE will be described below.

FIG. 14(a) is a diagram illustrating a signal flow for an exemplary Rx beam determination process of a UE.

The UE receives an NZP CSI-RS resource set TB including an RRC parameter 'Repetition' from a BS by RRC signaling (S1410). The RRC parameter 'Repetition' is set to 'ON' herein.

The UE repeatedly receives signals in resource(s) of a CSI-RS resource set for which the RRC parameter 'Repetition' is set to 'ON' on the same Tx beam (or DL spatial domain Tx filter) of the BS in different OFDM symbols (S1420).

The UE determines its Rx beam (S1430).

The UE skips CSI reporting (S1440). That is, the UE may skip CSI reporting, when the RRC parameter 'Repetition' is set to 'ON'.

With reference to FIGS. 13(b) and 14(b), a Tx beam determination process of a BS will be described below.

FIG. 14(b) is a diagram illustrating an exemplary Tx beam determination process of a BS.

A UE receives an NZP CSI-RS resource set IE including an RRC parameter 'Repetition' from the BS by RRC signaling (S1450). When the RRC parameter 'Repetition' is set to 'OFF', this is related to a Tx beam sweeping process of the BS.

The UE receives signals in resource(s) of a CSI-RS resource set for which the RRC parameter 'Repetition' is set to 'OFF' on different Tx beams (or DL spatial domain Tx filters) of the BS (S1460).

The UE selects (or determines) a best beam (S1470).

The UE reports the ID (e.g., CRI) of the selected beam and related quality information (e.g., an RSRP) to the BS (S1480). That is, the UE reports a CRI and an RSRP corresponding to the CRI, when a CSI-RS is transmitted for BM.

Figure 15:
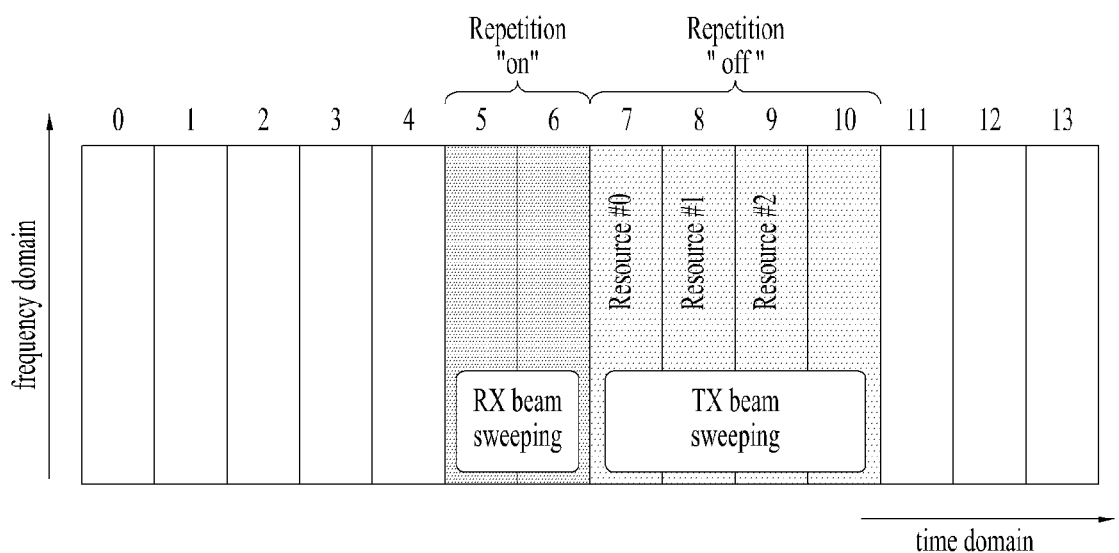

FIG. 15 is a diagram illustrating exemplary resource allocation in the time and frequency domains, which is related to the operation of FIG. 13.

When Repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 4 describes an example of a TCI-State IE. The TC-State IE is related to a QCL type corresponding to one or two DL RSs.

[Table 4]

TABLE 4

```
-- ASN1START
-- TAG-TCI-STATE-START
TCI-State : :=             SEQUENCE {
    tci-StateId                           TCI-StateId,
    qcl-Type1                             QCL-Info,
    qcl-Type2                             QCL-Info
                           OPTIONAL, -- Need R
    ...
}
QCL-Info : :=              SEQUENCE {
    cell                                  ServCell Index
                           OPTIONAL, -- Need R
    bwp-Id                                BWP-Id
                           OPTIONAL, -- Cond CSI-RS-Indicated
    referenceSignal                       CHOICE {
        csi-rs                                NZP-CSI-RS-ResourceId,
        ssb                                   SSB-Index
    },
    qcl-Type                              ENUMERATED {typeA, typeB,
typeC, typeD},
    ...
}
```

TABLE 4-continued

-- TAG-TCI-STATE-STOP
-- ASN1STOP

In Table 4, bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (QCL)

The UE may receive a list of up to M TCI-State configurations to decode a PDSCH according to a detected PDCCH carrying DCI intended for a given cell. M depends on a UE capability.

As described in Table 4, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

CSI-Related Operations

In the NR system, a CSI-RS is used for time/frequency tracking, CSI computation, reference signal received power (RSRP) calculation, and mobility. CSI computation is related to CSI acquisition, and RSRP computation is related to beam management (BM).

Figure 16:
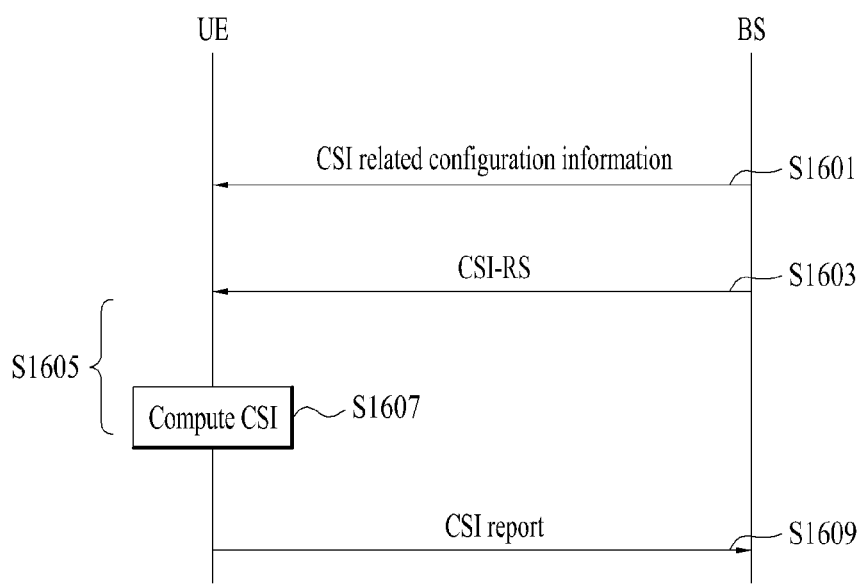
FIG. 16 is a diagram illustrating a signal flow for channel state information (CSI) reporting.

FIG. 16 is a diagram illustrating a signal flow for a CSI-related process.

For one of the above-described uses of the CSI-RS, a UE receives CSI-related configuration information from a BS by RRC signaling (S1601).

The CSI-related configuration information may include at least one of channel state information interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-SSB resource set. That is, the CSI resource configuration-related information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating the use of a CSI-RS (e.g., a BM-related parameter 'repetition' and a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S1605). The CSI measurement may include (1) CSI-RS reception of the UE (S1603) and (2) CSI computation in the received CSI-RS (S1607). Mapping of the CSI-RS to REs of CSI-RS resources in the time and frequency domains is configured by an RRC parameter, CSI-RS-ResourceMapping.

The UE reports the measured CSI to the BS (S1609).

1. CSI Measurement

The NR system supports more flexible and more dynamic CSI measurement and reporting. The CSI measurement may include reception of a CSI-RS and measurement of the received CSI-RS to acquire CSI.

As the time-domain behavior of CSI measurement and reporting, channel measurement (CM) and interference measurement (IM) are supported.

A CSI-IM-based IM resource (IMR) is designed in NR, similarly to a CSI-IM in LTE and configured independently of a zero power (ZP) CSI-RS resource for PDSCH rate matching.

The BS transmits an NZP CSI-RS to the UE on each port of a configured NZP CSI-RS-based IMR.

When there is no PMI and RI feedback for a channel, multiple resources are configured in a set, and the BS or network indicates a subset of NZP CSI-RS resources for channel measurement and/or interference measurement by DCI.

A resource setting and a resource setting configuration will be described in greater detail.

1. 1. Resource Setting

Each CSI resource setting 'CSI-ResourceConfig' includes a configuration of S≥1 CSI resource sets (given by an RRC parameter csi-RS-ResourceSetList). S represents the number of configured CSI-RS resource sets. The configuration of S≥1 CSI resource sets includes each CSI resource set including (NZP CSI-RS or CSI-IM) CSI-RS resources, and SSB resources used for RSRP computation.

Each CSI resource setting is located in a DL BWP identified by an RRC parameter bwp-id. All CSI resource settings linked to a CSI reporting setting have the same DL BWP.

The time-domain behavior of a CSI-RS resource within the CSI-ResourceConfig IE is indicated by an RRC parameter resourceType in the CSI resource setting, and may be set to aperiodic, periodic, or semi-persistent.

One or more CSI resource settings for channel measurement and interference measurement are configured by RRC signaling. A channel measurement resource (CMR) may be an NZP CSI-RS for CSI acquisition, and an IMR may be an NZP CSI-RS for CSI-IM and IM. The CSI-IM (or ZP CSI-RS for IM) is mainly used for inter-cell measurement. The NZP CSI-RS for IM is used mainly for measurement of intra-cell interference from multiple users.

The UE may assume that CSI-RS resource(s) for channel measurement and CSI-IM/NZP CSI-RS resource(s) for interference measurement configured for one CSI report are resource-wise quasi co-located (QCLed) with respect to 'QCL-TypeD'.

1. 2. Resource Setting Configuration

A resource setting may mean a resource set list, and one reporting setting may be linked to up to three resource settings.

- When one resource setting is configured, the resource setting (given by an RRC parameter resourcesForChannelMeasurement) is for channel measurement for RSRP computation.
- When two resource settings are configured, the first resource setting (given by the RRC parameter resourcesForChannelMeasurement) is for channel measurement and the second resource setting (given by csi-IM-ResourcesForinterference or nzp-CSI-RS-ResourcesForInterference) is for interference measurement on the CSI-IM or on the NZP CSI-RS.
- When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForinterference) is for NZP CSI-RS-based interference measurement.
- When one resource setting (given by resourcesForChannelMeasurement) is configured, the resource setting is for channel measurement for RSRP computation.
- When two resource settings are configured, the first resource setting (given by resourcesForChannelMeasurement) is for channel measurement and the second resource setting (given by the RRC parameter csi-IM-ResourcesForinterference) is used for interference measurement performed on the CSI-IM.

1. 3. CSI Computation

If interference measurement is performed on the CSI-IM, each CSI-RS resource for channel measurement is resource-wise associated with a CSI-IM resource by the ordering of the CSI-RS resources and CSI-IM resources in a corresponding resource set. The number of CSI-RS resources for channel measurement equals to the number of CSI-IM resources.

For CSI measurement, the UE assumes the following.

- Each NZP CSI-RS port configured for interference measurement corresponds to an interference transmission layer.
- All interference transmission layers on NZP CSI-RS ports for interference measurement take into account energy per resource element (EPRE) ratios.
- The UE assumes another interference signal on RE(s) of NZP CSI-RS resources for channel measurement, NZP CSI-RS resources for interference measurement, or CSI-IM resources for interference measurement.

2. CSI Reporting

Time and frequency resources available for the UE to report CSI are controlled by the BS.

For a CQI, a PMI, a CSI-RS resource indicator (CRI), an SSB resource indicator (SSBRI), a layer indicator (L1), an RI, and an RSRP, the UE receives RRC signaling including N≥1 CSI-ReportConfig reporting settings, M≥1 CSI-ResourceConfig resource settings, and one or two lists of trigger states (given by aperiodicTriggerStateList and semi-PersistentOnPUSCH-TriggerStateList). Each trigger state in aperiodicTriggerStateList includes a list of associated CSI-ReportConfigs indicating resource set IDs for a channel and optionally for interference. Each trigger state in semiPersistentOnPUSCH-TriggerStateList contains one associated CSI-ReportConfig.

That is, the UE transmits a CSI report indicated by CSI-ReportConfigs associated with a corresponding CSI-RS resource setting to the BS. For example, the UE may report at least one of a CQI, a PMI, a CR1, an SSBRI, an LI, an RI, or an RSRP as indicated by CSI-ReportConfigs associated with the CSI resource setting. However, if CSI-ReportConfigs associated with the CSI resource setting indicates 'none', the UE may not report CSI or an RSRP associated with the CSI resource setting. The CSI resource setting may indicate resources for an SS/PBCH block.

DL Channel Structures

An eNB transmits related signals on later-described DL channels to a UE, and the UE receives the related signals on the DL channels from the eNB.

(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 17:
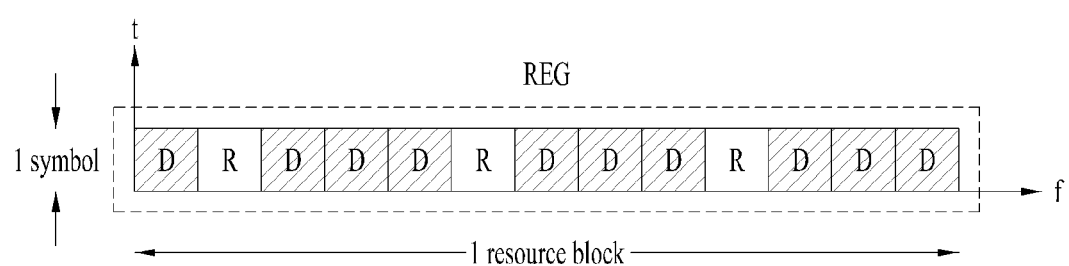
FIGS. 17, 18, and 19 are diagrams illustrating a physical downlink control channel (PDCCH) in the NR system.

FIG. 17 illustrates an exemplary structure of one REG. In FIG. 17, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

Figure 18:
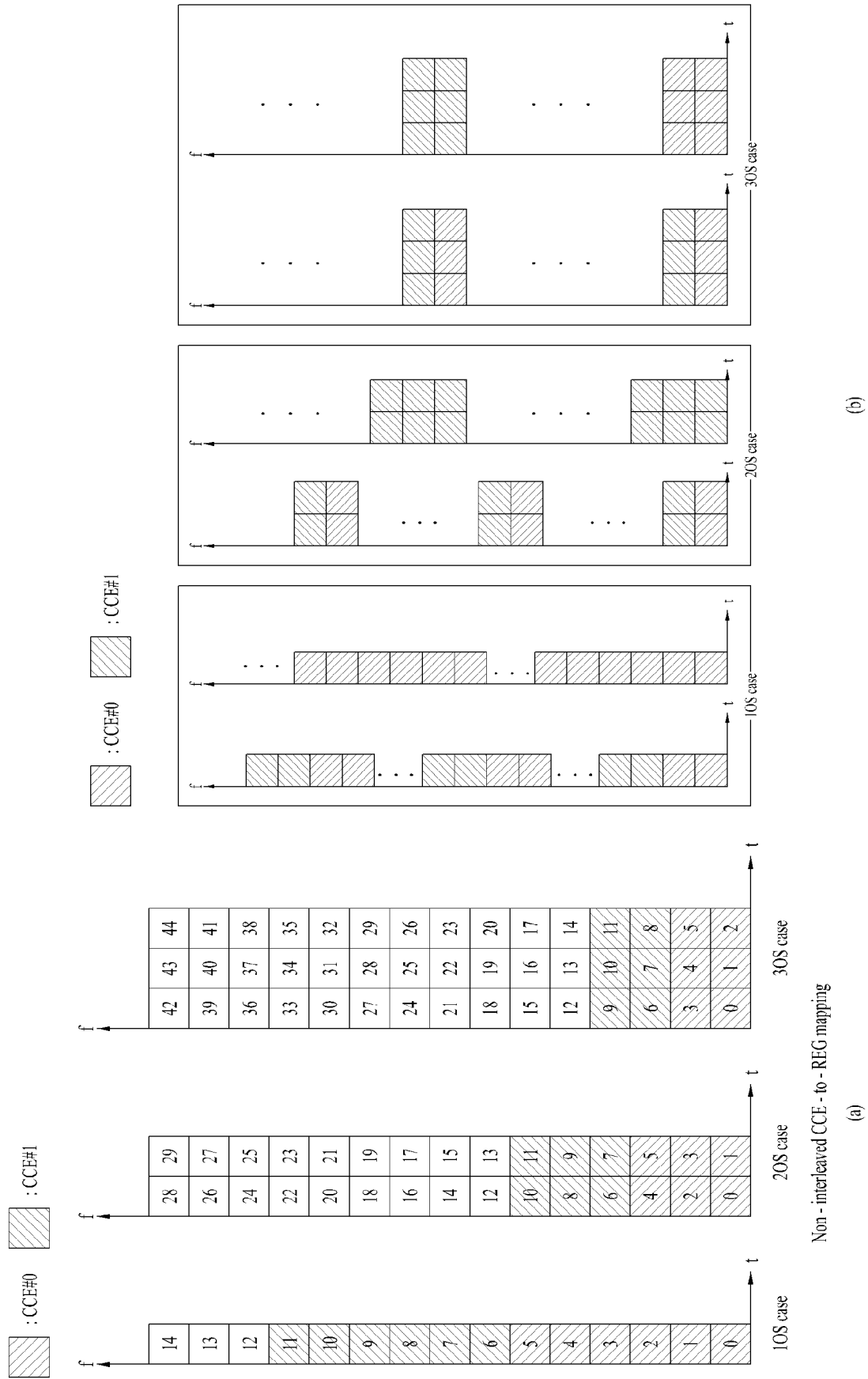

CCE-to-REG mapping for the CORESET may be an interleaved type or a non-interleaved type. FIG. 18(a) is an exemplary view illustrating non-interleaved CCE-REG mapping, and FIG. 18(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 19:
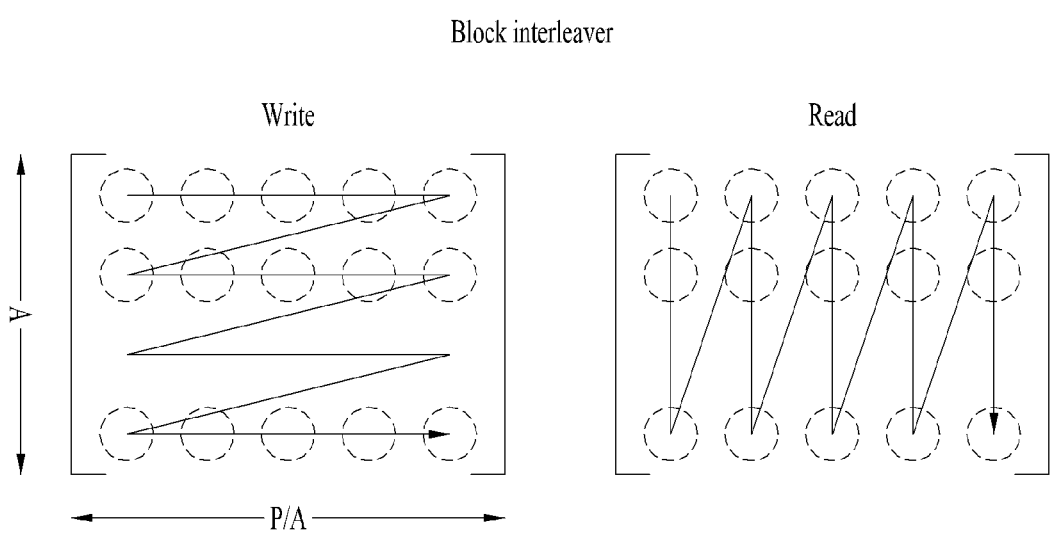

FIG. 19 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 8. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

[Table 5] lists exemplary features of the respective search space types.

TABLE 5

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

[Table 6] lists exemplary DCI formats transmitted on the PDCCH.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

Various embodiments in which two or more DL signals with different types or configurations are transmitted and received will be described in this document.

Figure 20:
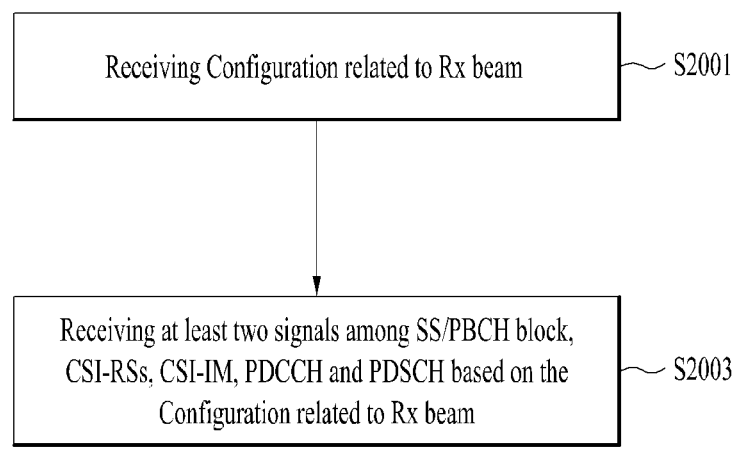
FIGS. 20 to 22 illustrate operations of a UE, a base station, and a network according to the present disclosure.
Figure 21:
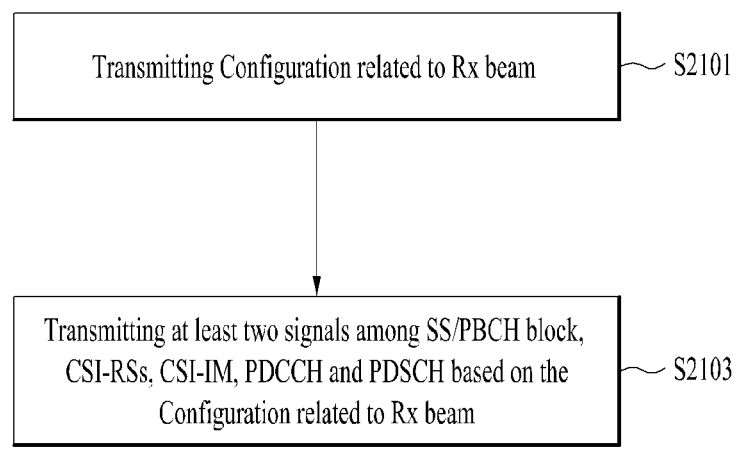
Figure 22:
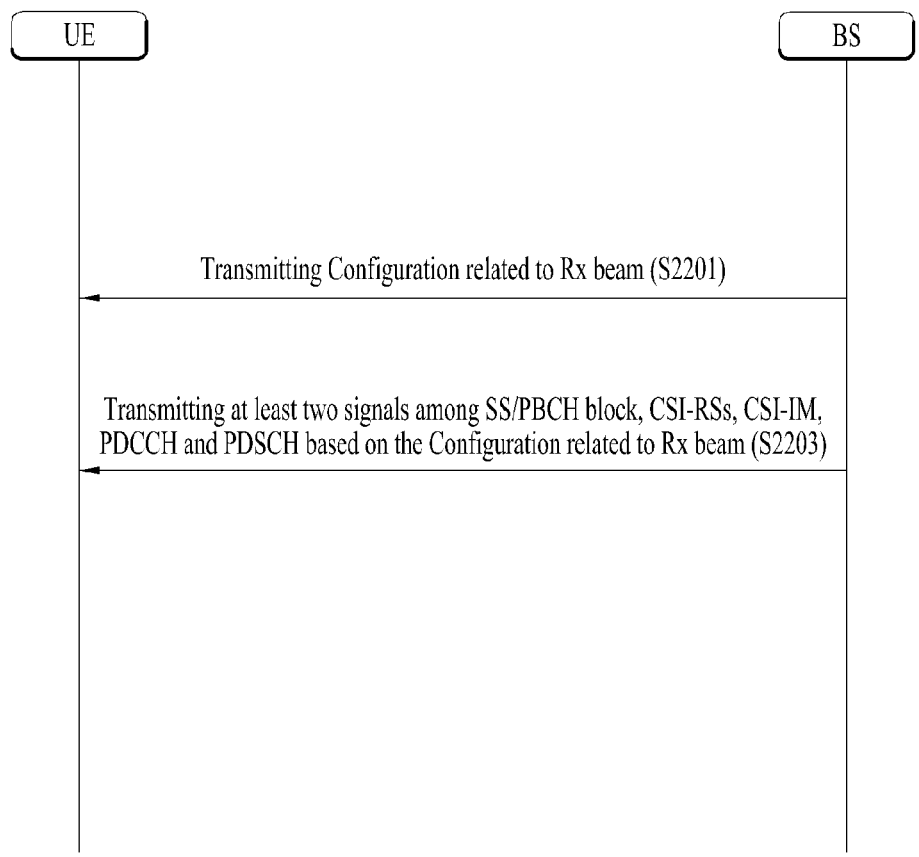

FIGS. 20 to 22 illustrate UE, BS, and network operations according to embodiments of the present disclosure.

Referring to FIG. 20, a UE may receive a configuration for Rx beams (S2001). For example, the configuration for Rx beams may include configurations such as QCL, Repetition ON/OFF, ReportQuantity, and/or TRS-info. Which configuration the UE receives may be determined according to the following embodiments.

Based on the received configuration, the UE may receive two or more DL signals with different types or configurations among DL signals such as an SS/PBCH block, CSI-RS, CSI-IM, PDCCH, and PDSCH (S2003). For example, the two or more DL signals may be frequency division multiplexed (FDM) in the same time region. In addition, the two or more DL signals may be received on different component carriers (CCs). In this case, types, configurations, transmission formats, and/or reception methods of the two or more DL signals may be determined in the following embodiments.

Referring to FIG. 21, a BS may transmit a configuration for Rx beams (S2101). For example, the configuration for Rx beams may include configurations such as QCL, Repetition ON/OFF, ReportQuantity, and/or TRS-info. Which configuration the BS transmits may be determined according to the following embodiments.

Based on the transmitted configuration, the BS may transmit two or more DL signals with different types or configurations among DL signals such as an SS/PBCH block, CSI-RS, CSI-IM, PDCCH, and PDSCH (S2103). For example, the two or more DL signals may be FDM in the same time region. In addition, the two or more DL signals may be transmitted on different CCs. In this case, types, configurations, transmission formats, and/or methods of the two or more DL signals may be determined according to the following embodiments.

FIG. 22 illustrates an implementation example of a network according to the present disclosure. Referring to FIG. 22, a BS may transmit a configuration for Rx beams to a UE (S2201). For example, the configuration for Rx beams may include configurations such as QCL, Repetition ON/OFF, ReportQuantity, and/or TRS-info. Which configuration the BS transmits to the UE may be determined according to, the following embodiments.

Based on the transmitted configuration, the BS may transmit to the UE two or more DL signals with different types or configurations among DL signals such as an SS/PBCH block, CSI-RS, CSI-IM, PDCCH, and PDSCH (S2203). For example, the two or more DL signals may be FDM in the same time region and transmitted to the UE. In addition, the two or more DL signals may be transmitted to the UE on different CCs. In this case, types, configurations, transmission formats, and/or methods of the two or more DL signals may be determined according to the following embodiments.

Embodiment 1

Figure 23:
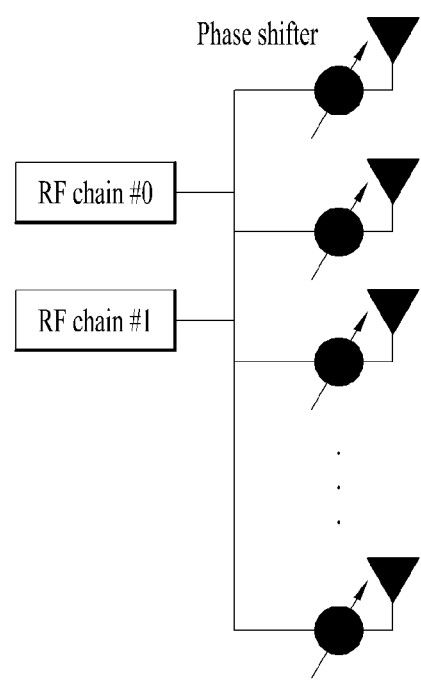
FIG. 23 is a diagram illustrating an example of implementing an antenna structure for carrier aggregation.

When carrier aggregation (CA) is configured, analog beams generated through different radio frequency (RF) chains may be shared based on the antenna structure of the UE. For example, when the UE has the antenna structure shown in FIG. 23, the UE may use only RF chain #0 if a single CC is configured. However, in the case of inter-band CA that further uses other CCs, which are significantly different from the configured CC, the UE may additionally use RF chain #1. In this case, analog beams as well as antenna elements may be shared between RF chain #1 and RF chain #0. For example, as shown in FIG. 23, if RF chain #1 and RF chain #0 share a phase shifter, only a single analog beam may be formed.

The present disclosure proposes BS and UE operations for transmitting and receiving different RSs and/or channels in consideration of the above-described structural features of the UE.

UEs may be classified into two types (Type A and Type B) depending on UE capabilities. The BS may enable/disable at least one of the following UE operations, which are configured differently depending on the UE type (Type A or Type B), through higher layer signaling. The higher layer signaling may be radio resource control (RRC) and/or medium access control (MAC) control element (CE).

In the present disclosure, Type A and Type B UEs are defined as follows to distinguish between UE behaviors.

(1) Type A UE: a UE capable of simultaneously receiving a plurality of signals, which are transmitted on different CCs or bandwidth parts (BWPs) at the same time point, on different (independent) analog beams When inter-band CA and/or intra-band CA is configured, the Type A UE may report to the BS information about a combination of CCs, a CC group, a combination of BWPs, and/or a BWP group, where independent analog beams may be formed. When the inter-band CA and/or intra-band CA is configured, the UE may report to the BS information about a combination of CCs, a CC group, a combination of BWPs, and/or a BWP group, where analog beams are shared.

(2) Type B UE: a UE capable of simultaneously receiving a plurality of signals, which are transmitted on different CCs or BWPs at the same time, on a single analog beam, regardless of whether the UE has a single TXRU/RF chain or multiple TXRU/RF chains The UE may report/transmit to the BS whether its UE type is Type A or Type B. When the UE reports Type B, the BS may always apply spatial QCL to different RSs and/or channels to transmit the RSs and/or channels to the UE. In other words, the BS may transmit multiple data on the same Tx beam so that the UE may receive the multiple data on a single Rx beam.

Hereinafter, methods by which each type of UE receives DL signal(s) on two or more CCs will be described based on the above-described UE types.

The following embodiments may be not only applied when CA is configured but also extended and applied when a single component carrier is configured.

When the UE is configured with two different CCs, the UE may receive an SS/PBCH block and a PDSCH on the CCs. For example, when the UE is configured with two CCs: CC #0 and CC #1, the UE may receive the SS/PBCH block on CC #0 and receive the PDSCH on CC #1. On the contrary, the UE may receive the PDSCH on CC #0 and receive the SS/PBCH block on CC #1. That is, the SS/PBCH block and PDSCH may be transmitted on different CCs.

In this case, the UE may perform different operations to receive the SS/PBCH block and PDSCH depending on the type of the UE (Type A or Type B). The BS may enable/disable at least one of the following UE operations, which are configured differently depending on the UE type (Type A or Type B), through higher layer signaling. The higher layer signaling may be RRC and/or MAC CE.

Hereinafter, how each of the Type A UE and Type B UE operates when each UE is configured with two CCs and receives the SS/PBCH block and PDSCH on the CCs will be described.

(3) Type A UE: the Type A UE may form an Rx analog beam optimized/suitable for receiving the SS/PBCH block transmitted on CC #0 and an Rx analog beam optimized/suitable for receiving the PDSCH transmitted on CC #1 and then receive the SS/PBCH block and PDSCH. In this case, the analog beam for receiving the PDSCH may be fixed, but the beam for receiving the SS/PBCH block may be changed by beam sweeping.

If a spatial QCL reference for the PDSCH transmitted on CC #1 is the SS/PBCH block transmitted on CC #0, the UE may form a common Rx analog beam by assuming that the PDSCH transmitted on CC #1 and the SS/PBCH block transmitted on CC #0 are spatially QCLed and then receive the SS/PBCH block and PDSCH.

(4) Type B UE:

1) The Type B UE may receive the PDSCH and SS/PBCH block on an Rx beam suitable/optimized for a beam on which the PDSCH is transmitted. For example, when the UE determines that receiving the PDSCH is more important or when the BS informs the UE that the PDSCH reception is more important, the UE may form an Rx analog beam suitable for the PDSCH reception.

For example, the BS may implicitly indicate/configure to/for the UE that the priority of the PDSCH reception is higher than that of the SS/PBCH block reception by indicating/configuring that no Rx beam sweeping is required.

QCL may be a long-term process. Thus, assuming that an SS/PBCH block received together with the PDSCH at the current time is SS/PBCH block #1, the spatial QCL reference for the PDSCH may be set to SS/PBCH block #0 rather than SS/PBCH block #1 that is transmitted together at the current time. In this case, the Type B UE may perform the following operations. In addition, the BS may configure/indicate that the UE perform the following operations. The following operations may be not only applied when CA is configured but also extended and applied when a single component carrier is configured.

The UE prioritizes the PDSCH reception over reception of SS/PBCH block #1. That is, the UE may receive the PDSCH and SS/PBCH block #1 based on predetermined PDSCH reference QCL. In other words, the UE may receive the PDSCH and SS/PBCH block #1 in the direction of an Rx beam for SS/PBCH block #0 that is previously transmitted.

Alternatively, the UE prioritizes the reception of SS/PBCH block #1 over the PDSCH reception. For example, the UE may ignore the predetermined PDSCH reference QCL. The UE may assume that the direction of an Rx beam for SS/PBCH block #1 is quite similar to the direction of a beam for the PDSCH reception. In this case, if the UE ignores the predetermined PDSCH reference QCL, i.e., the direction of the Rx beam for previously transmitted SS/PBCH block #1, the UE may have no significant problem in receiving the PDSCH.

Alternatively, when SS/PBCH block #1 is included in a resource setting and ReportQuantity associated with SS/PBCH block #1 is 'SSB resource indicator (SSBRI)', 'SSBRI/L1-RSRP', and/or 'ssb-Index-RSRP', the UE may receive the PDSCH and SS/PBCH block #1 based on the predetermined PDSCH reference QCL. This may be to prioritize the PDSCH reception over the SS/PBCH block reception. The UE may calculate a CSI-RS resource indicator (CRI) for SS/PBCH block #1 based on an Rx beam used to receive SS/PBCH block #0.

Alternatively, when SS/PBCH block #1 is included in the resource setting and ReportQuantity associated with SS/PBCH block #1 is 'SSBRI', 'SSBRI/L1-RSRP', and/or 'ssb-Index-RSRP', the UE may ignore the predetermined PDSCH reference QCL and give a higher priority to SS/PBCH block #1. If the UE and BS perform P1 beam management, the UE may perform Rx beam sweeping over four OFDM symbols for receiving SS/PBCH block #1 and calculate the SSBRI and L1-RSRP for each Rx beam. Here, the P1 beam management may mean that the BS performs Tx beam sweeping and the UE performs the Rx beam sweeping. The BS and UE may identify appropriate Tx and Rx beams from the P 1 beam management.

Alternatively, when SS/PBCH block #1 is included in the resource setting and ReportQuantity associated with SS/PBCH block #1 is 'no report' or 'none', the UE may prioritize the reception of SS/PBCH block #1 over the PDSCH reception. That is, the UE may ignore the spatial QCL reference predetermined for the PDSCH and perform the Rx beam sweeping over four OFDM symbols for receiving SS/PBCH block #1. For example, the UE may use different reception filters while receiving the four OFDM symbols for SS/PBCH block #1. This may be interpreted to mean that the Rx beam sweeping or P3 beam management is prioritized over the PDSCH reception. Here, the P3 beam management may mean that the Tx beam of the BS is fixed but the Rx beam of the UE is swept. For example, the P3 beam management may be required to perform the Rx beam sweeping on four OFDM symbols included in the SS/PBCH block precisely.

Alternatively, when SS/PBCH block #1 is included in the resource setting and ReportQuantity associated with SS/PBCH block #1 is 'no report' or 'none', the UE may prioritize the PDSCH reception over the SS/PBCH block reception. Thus, the UE may ignore the reception of SS/PBCH block #1 and perform/expect no Rx beam sweeping. Since the UE may not be forced to perform the RX beam sweeping when ReportQuantity is set to 'no report', the BS may impose restrictions on the Rx beam sweeping at the UE by forcing the UE to perform the PDSCH reception.

2) The SS/PBCH block and PDSCH are received on an Rx beam suitable/optimized for a beam on which the SS/PBCH block is transmitted. That is, when the BS indicates/configures to/for the UE that the SS/PBCH block reception is more important for radio resource management (RRM) measurement and/or Rx beam refinement, the UE may form an Rx analog beam suitable for the SS/PBCH block reception. Alternatively, when the UE recognizes that the SS/PBCH block reception is more important for the RRM measurement and/or Rx beam refinement, the UE may form the Rx analog beam suitable for the SS/PBCH block reception. In this case, the BS may implicitly indicate/configure to/for the UE that the priority of the SS/PBCH block reception is higher than that of the PDSCH reception by indicating/configuring that the Rx beam sweeping is enabled.

3) The UE prioritizes receiving a signal transmitted on a primary CC. That is, the UE forms an Rx beam suitable/optimized for receiving one of the PDSCH and SS/PBCH block, which is transmitted on the primary CC.

4) The UE may prioritize a signal received on a CC with the lowest or highest index among CCs configured for the UE. Alternatively, the BS may indicate/configure to/for the UE the index of a CC with a high priority.

Although the priorities and Rx beams of the PDSCH and SS/PBCH block have been described in Embodiment 1, the principle may be extended and applied between the PDCCH and SS/PBCH block, between the PDSCH and CSI-RS, and between the PDCCH and CSI-RS. However, in Embodiment 1, if the SS/PBCH block is replaced by the CSI-RS, ReportQuantity corresponding to 'SSBRI' may be interpreted as 'CRI'. Further, the CC in Embodiment 1 may be interpreted/applied/extended as the BWP.

When the UE is configured with two different CCs, the UE may receive a PDCCH and a PDSCH on the CCs. For example, when the UE is configured with two CCs: CC #0 and CC #1, the UE may receive the PDCCH on CC #0 and receive the PDSCH on CC #1. On the contrary, the UE may receive the PDSCH on CC #0 and receive the PDCCH on CC #1. That is, the PDCCH and PDSCH may be transmitted on different CCs.

In this case, the UE may perform different operations to receive the PDCCH and PDSCH depending on the type of the UE (Type A or Type B). The BS may enable/disable at least one of the following UE operations, which are configured differently depending on the UE type (Type A or Type B), through higher layer signaling. The higher layer signaling may be RRC and/or MAC CE.

Hereinafter, how each of the Type A UE and Type B UE operates when each UE is configured with two CCs and receives the PDCCH and PDSCH on the CCs will be described.

(5) Type A UE: the Type A UE may form an Rx analog beam optimized/suitable for receiving the PDSCH transmitted on CC #0 and an Rx analog beam optimized/suitable for receiving the PDCCH transmitted on CC #1 and then receive PDCCH and PDSCH.

(6) Type B UE:

1) The Type B UE receives the PDSCH and PDCCH on an Rx beam suitable/optimized for a beam on which the PDSCH is transmitted. That is, the PDSCH reception is prioritized over the PDCCH reception. In this case, the priority may be indicated/configured by the BS or determined by the UE.

2) The Type B UE receives the PDSCH and PDCCH on an Rx beam suitable/optimized for a beam on which the PDCCH is transmitted. That is, the PDCCH reception is prioritized over the PDSCH reception. In this case, the priority may be indicated/configured by the BS or determined by the UE.

3) The UE prioritizes receiving a signal transmitted on a primary CC. That is, the UE forms an Rx beam suitable/optimized for receiving one of the PDSCH and PDSCH, which is transmitted on the primary CC.

4) The UE may prioritize a signal received on a CC with the lowest index or the highest index among CCs configured for the UE. Alternatively, the BS may indicate/configure to/for the UE the index of a CC with a high priority.

5) The UE may receive the PDSCH and PDCCH on one common analog beam by assuming that the two signals are QCLed.

The PDSCH and PDCCH in Embodiment 1 may be extended to the PUSCH and PUCCH. Further, the CC in Embodiment 1 may be interpreted/applied/extended as the BWP.

In addition, the reception of the SS/PBCH block and PDSCH may be combined with the reception of the PDCCH and PDSCH. For example, when the Type B UE is configured with three or more CCs and receives the SS/PBCH block, PDSCH, and PDCCH on different CCs, any one of the embodiments described in (4) may be combined with any one of the embodiments described in (6).

Embodiment 2

In Embodiment 2, UE operations and/or BS configurations/indications when two DL signals with different types and/or configurations are multiplexed will be described.

First, UE operations and/or BS configurations/indications when a CSI-IM is multiplexed with an SS/PBCH block or CSI-RS will be described.

Figure 24:
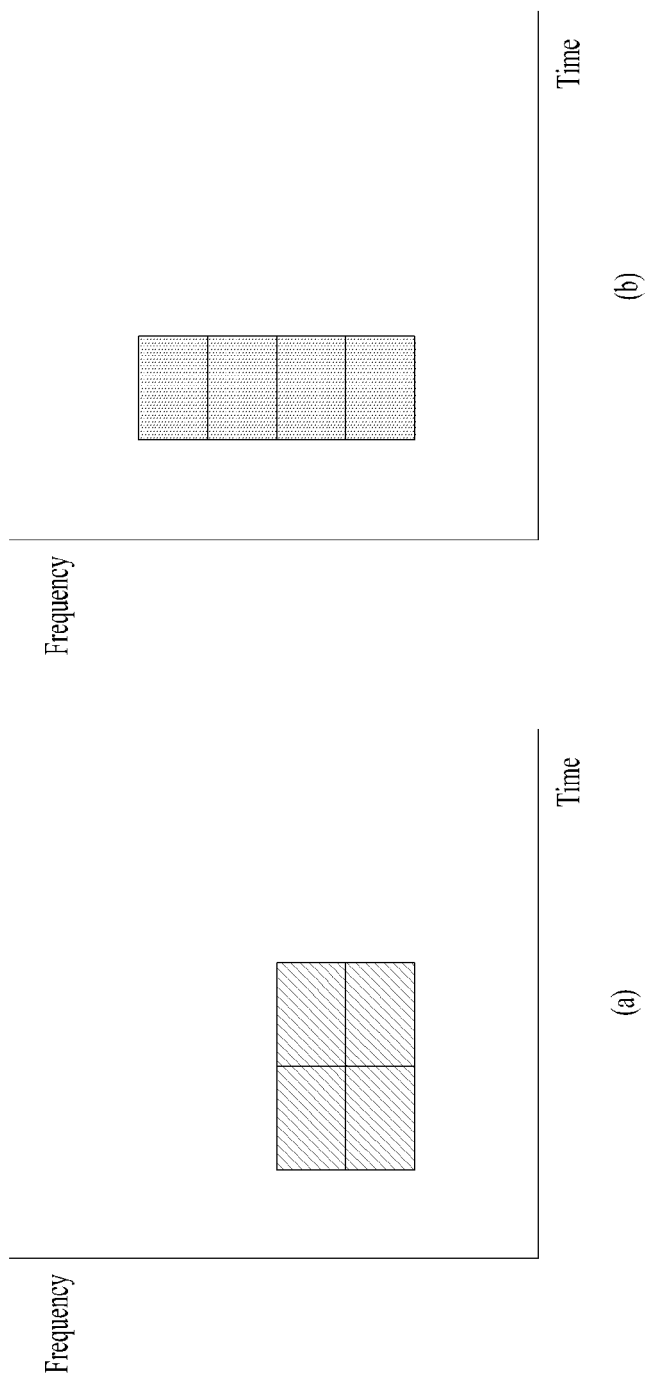
FIG. 24 illustrates channel state information interference measurement (CSI-IM) resource element mapping patterns.

FIG. 24 illustrates CSI-IM RE patterns. Specifically, FIG. 24 (a) illustrates a (2,2) RE pattern based CSI-IM. Referring to the (2,2) RE pattern based CSI-IM of FIG. 24 (a), the CSI-IM may be mapped to two OFDM symbols and two subcarriers. The BS may configure for the UE an OFDM symbol index $l_{CSI-IM}$ and a subcarrier index $k_{CSI-IM}$. The CSI-IM may be received on REs corresponding to ($k_{CSI-IM}$, $l_{CSI-IM}$), ($k_{CSI-IM}$, $l_{CSI-IM}+1$), ($k_{CSI-IM}+1$, $l_{CSI-IM}$), and ($k_{CSI-IM}+1$, $l_{CSI-IM}+1$). An RE pattern corresponding to the (2,2) RE pattern based CSI-IM of FIG. 24 (a) may be referred to as CSI-IM RE pattern 0.

FIG. 24 (b) shows a (4,1) RE pattern based CSI-IM. Referring to the (4,1) RE pattern based CSI-IM of FIG. 24 (b), the CSI-IM may be mapped to one OFDM symbol and four subcarriers. The BS may configure the OFDM symbol index $l_{CSI-IM}$ and the subcarrier index $k_{CSI-IM}$ for the UE. The CSI-IM may be received on REs corresponding to ($k_{CSI-IM}$, $l_{CSI-IM}$), ($k_{CSI-IM}+1$, $l_{CSI-IM}$), ($k_{CSI-IM}+2$, $l_{CSI-IM}$), and ($k_{CSI-IM}+3$, $l_{CSI-IM}$). An RE pattern corresponding to the (4,1) RE pattern based CSI-IM of FIG. 24 (b) may be referred to as CSI-IM RE pattern 1.

When the UE performs the Rx beam sweeping, interference measurement may vary for each symbol. Based on this, the UE may assume/expect that the (4,1) RE pattern based CSI-IM is capable of being transmitted/configured together in OFDM symbols where the SS/PBCH block is transmitted. In other words, the UE may assume/expect that the SS/PBCH block and (4,1) RE pattern based CSI-IM are frequency division multiplexed (FDM) in OFDM symbols where the SS/PBCH block is transmitted.

When the UE performs the Rx beam sweeping, the UE may assume/expect that the (2,2) RE pattern based CSI-IM is not transmitted in OFDM symbols where the SS/PBCH block is transmitted. In other words, when the UE performs the Rx beam sweeping, the UE may assume/expect that the SS/PBCH block and (2,2) RE pattern based CSI-IM are time division multiplexed (TDM) in OFDM symbols where the SS/PBCH block is transmitted. When the BS anticipates the Rx beam sweeping at the UE, the BS may configure/indicate for/to the UE that the (4,1) RE pattern based CSI-IM is capable of being transmitted/configured together in OFDM symbols where the SS/PBCH block is transmitted. Further, the BS may configure/indicate for/to the UE that the (2,2) RE pattern based CSI-IM is not transmitted/configured together in OFDM symbols where the SS/PBCH block is transmitted.

The (4,1) RE pattern based CSI-IM may be transmitted/configured together with an SS/PBCH block for RRM, an SS/PBCH block for radio link monitoring (RLM), an SS/PBCH block for beam management (BM), or an SS/PBCH block for beam failure detection (BFD) in the same OFDM symbol. The (2,2) RE pattern based CSI-IM and SS/PBCH block for BFD may be configured to be transmitted in the same OFDM symbol.

Thus, it may be assumed/expected that the UE is allowed to perform the Rx beam sweeping on all of the SS/PBCH block for RRM, SS/PBCH block for RLM, and SS/PBCH block for BM. However, in the case of the SS/PBCH block for BFD, an Rx beam therefor needs to be fixed to determine beam failure. Further, it is desirable to use the same Rx beam during interference measurement unless different interference signals are measured. Therefore, in the case of the (2,2) RE pattern based CSI-IM, it is desirable not to perform the Rx beam sweeping for each OFDM symbol during the interference measurement.

Similarly to above, a CSI-RS for CSI acquisition, a CSI-RS for BFD, or a CSI-RS for time-frequency tracking may be received on a fixed Rx beam without beam sweeping for each OFDM symbol.

Thus, the UE may expect/assume that the (4,1) RE pattern based CSI-IM is capable of transmitted/configured together with all types of CSI-RSs (e.g., CSI-RS for RRM, CSI-RS for CSI acquisition, CSI-RS for BM, CSI-RS for time-frequency tracking, etc.) in the same OFDM symbol. However, the UE may not expect/assume that the (2,2) RE pattern based CSI-IM and CSI-RS for BM capable of performing the beam sweeping are transmitted/configured in the same OFDM symbol.

The UE may not expect/assume that the (2,2) RE pattern based CSI-IM and CSI-RS resources included in a CSI-RS resource set where a higher layer parameter 'repetition' is set to 'ON' and/or 'OFF' are configured/transmitted in the same OFDM symbol. However, the UE may expect/assume that the (4,1) RE pattern based CSI-IM and CSI-RS resources included in the CSI-RS resource set where the higher layer parameter 'repetition' is set to 'ON' and/or 'OFF' are configured/transmitted in the same OFDM symbol.

In a slot including 14 OFDM symbols, FDM may be allowed between the SS/PBCH block and CSI-RS for BM. That is, no FDM may be allowed between the SS/PBCH block and other CSI-RSs except the CSI-RS for BM.

However, in a mini-slot or non-slot including 2/4/7 OFDM symbols, it may be difficult to avoid FDM between the SS/PBCH block and the CSI-RS for CSI acquisition or CSI-RS for time-frequency tracking. In this case, considering the Rx beam sweeping when the SS/PBCH block and CSI-RS are FDM, the CSI-RS for CSI acquisition may have problems in CSI measurement, for example, the orthogonal property of an orthogonal cover code (OCC) is not satisfied due to different channel information about the same port transmitted in different OFDM symbol during the Rx beam sweeping.

For multiplexing between the CSI-RS and SS/PBCH block, the UE may operate as follows, and/or the BS may configure/indicate the following UE operations.

Considering that among CSI-RSs for CSI acquisition, a CSI-RS using one or two ports is mapped to a single OFDM symbol, and the UE performs the CSI measurement only on a specific OFDM symbol, there may be no significant problems in the performance of the CSI measurement performance even though the Rx beam sweeping is performed for each OFDM symbol. Thus, for multiplexing between the CSI-RS for CSI acquisition and SS/PBCH block, the UE may assume/expect that only the CSI-RS for CSI acquisition based on one or two ports is transmitted in the same OFDM symbol as the SS/PBCH block. When a 4-port CSI-RS is mapped to a single OFDM symbol as in the fourth row of Table 7.4.1.5.3-1 in 3GPP TS 38.211, the UE may assume/expect that the CSI-RS and the SS/PBCH block are capable of being transmitted in the same OFDM symbol. That is, an X-port (X<=4) CSI-RS mapped to a single OFDM symbol may be allowed to be FDM with the SS/PBCH block, but an X-port (X<=4) CSI-RS occupying two or more OFDM symbols may be allowed to be TDM with the SS/PBCH block.

When the CSI-RS for CSI acquisition and SS/PBCH block are transmitted together over multiple OFDM symbols, the number of times that the UE performs the Rx beam sweeping and the capability thereof may be determined/limited by the indices of configured CSI-RS ports, code division multiplexing (CDM) types, and/or CDM lengths. Further, the BS may configure/indicate the number and capability.

Specifically, when the CSI-RS and SS/PBCH block are transmitted together in four OFDM symbols reserved for the SS/PBCH block, the UE may expect no Rx beam sweeping in OFDM symbols spanned by a specific CDM group of X-port CSI-RSs. In other words, it is expected that the UE performs the Rx beam sweeping on OFDM symbols to which different CDM groups are mapped. For example, referring to FIGS. 25 (a) to (c), it is expected that the UE performs the Rx beam sweeping at a boundary where the CDM group switches from CDM4 group 1 to CDM4 group 2. As another example, when CDM8 is configured over four OFDM symbols including the SS/PBCH block, it may be expected that the UE performs no Rx beam sweeping while receiving the CSI-RS in the four OFDM symbols.

Figure 25:
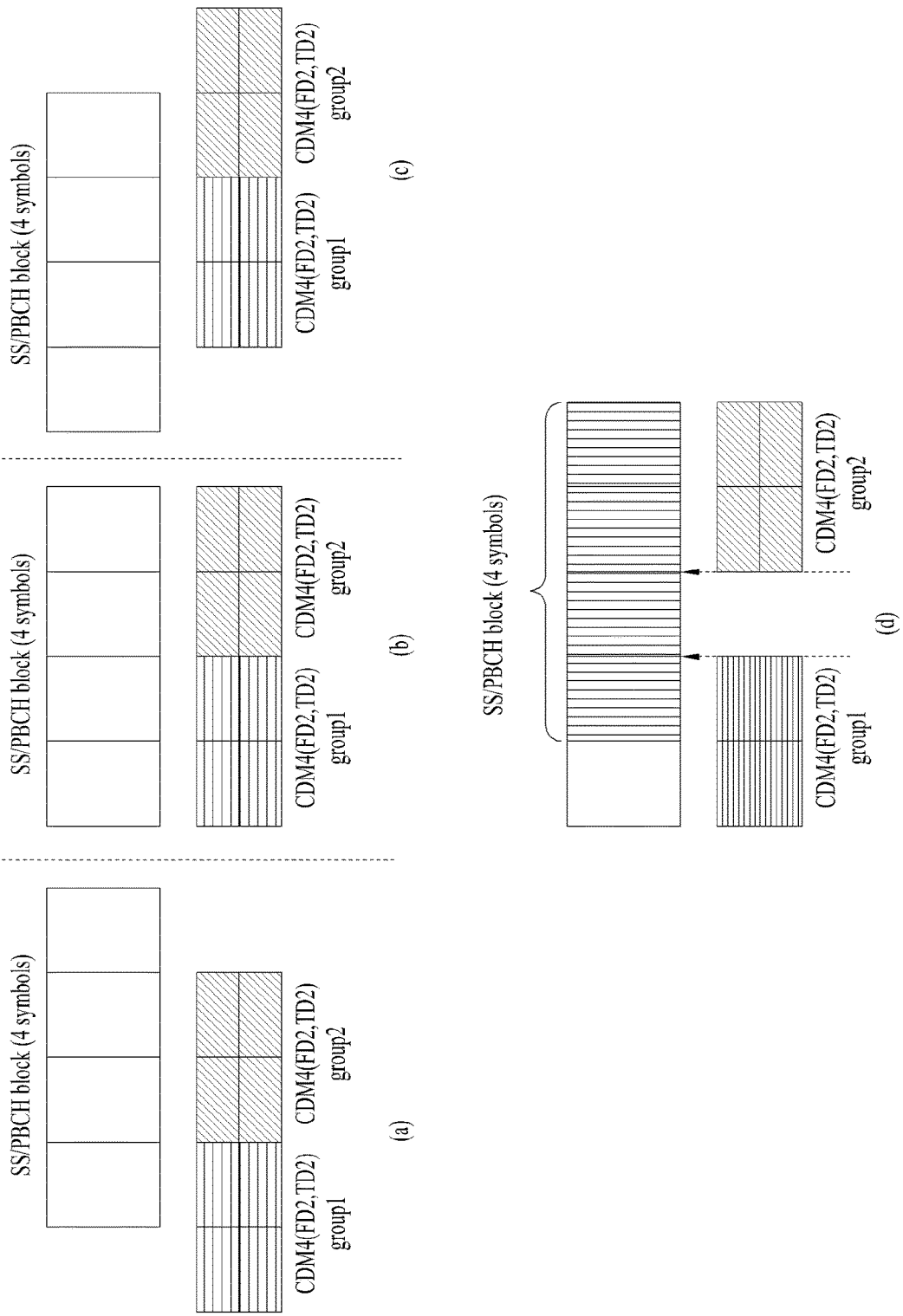
FIG. 25 illustrates an example in which a UE receives a channel state information reference signal (CSI-RS) and an SS/PBCH block which are multiplexed.

Similarly, when different CSI-RS CDM groups are not consecutive in the time domain as shown in FIG. 25 (d), it may be expected that the UE performs the Rx beam sweeping at the locations of FIG. 25 (d) indicated by arrows. According to the X-port CSI-RS configuration, multiple CDM groups may be for the same CSI-RS resource or for different CSI-RS resources. The above-described UE operations may be configured/indicated by the BS. That is, to measure accurate channel information about a specific port, the Rx beam may need to be fixed while the CSI-RS for the specific port is measured. For example, it is assumed that ports #0/#1/#2/#3 are configured for CDM4 that spans two OFDM symbols in FIGS. 25 (a) to (c). If different Rx beams (e.g., RX #0 and RX #1) are used for the two OFDM symbols, a channel for RX #0 and ports #0/#1/#2/#3 may be different from that for RX #1 and ports #0/#1/#2/#3. In this case, the orthogonal property of the OCC may not be satisfied. Thus, it may be expected that the UE performs no Rx beam sweeping on OFDM symbols spanned by one CDM group. For example, when two CDM4 groups that occupy two frequency domains (e.g., two subcarriers) and two time domains (e.g., two OFDM symbols) are FDM with the SS/PBCH block as shown in FIGS. 25 (a) to (c), it may be expected that the UE performs no beam sweeping on OFDM symbols corresponding to one CDM4 group.

Alternatively, considering FDM between the CSI-RS for CSI acquisition and SS/PBCH block, the UE may expect/assume that only an X-port (X>=2) CSI-RS, where FD-CDM2 is configured, is capable of being transmitted together with the SS/PBCH block in an OFDM symbol reserved for the SS/PBCH block. This configuration may allow the UE to perform the Rx beam sweeping in the SS/PBCH block including four OFDM symbols.

Alternatively, it may be expected that the UE performs no Rx beam sweeping in OFDM symbol(s) where the CSI-RS for CSI acquisition and SS/PBCH block are transmitted together.

When the CSI-RS for BM is transmitted in OFDM symbol(s) reserved for the SS/PBCH block, it may be expected that the UE performs the Rx beam sweeping or Rx beam refinement. When the CSI-RS for CSI acquisition is transmitted together in the OFDM symbol(s) reserved for the SS/PBCH block, it may be assumed that the UE performs no Rx beam sweeping. In other words, it is assumed that the UE does not use a different reception filter for each OFDM symbol. In this case, the CSI-RS for CSI acquisition may refer to CSI-RS resources included in a CSI-RS resource set where the higher layer parameters 'repetition' and 'TRS-Info' are not configured. This may be interpreted to mean that when the SS/PBCH block and CSI-RS for CSI acquisition are FDM and received, the reception of the CSI-RS for CSI acquisition is prioritized. The aforementioned UE operations may be indicated or configured by the BS.

In addition, how the UE and BS operates when CSI-RSs with different types or configurations are multiplexed needs to be considered as well. Hereinafter, a description will be given of how the UE operates when the CSI-RS for BM is multiplexed with the CSI-RS for CSI acquisition or CSI-RS for time-frequency tracking. Such UE operations may be configured and/or indicated by the BS.

Figure 26:
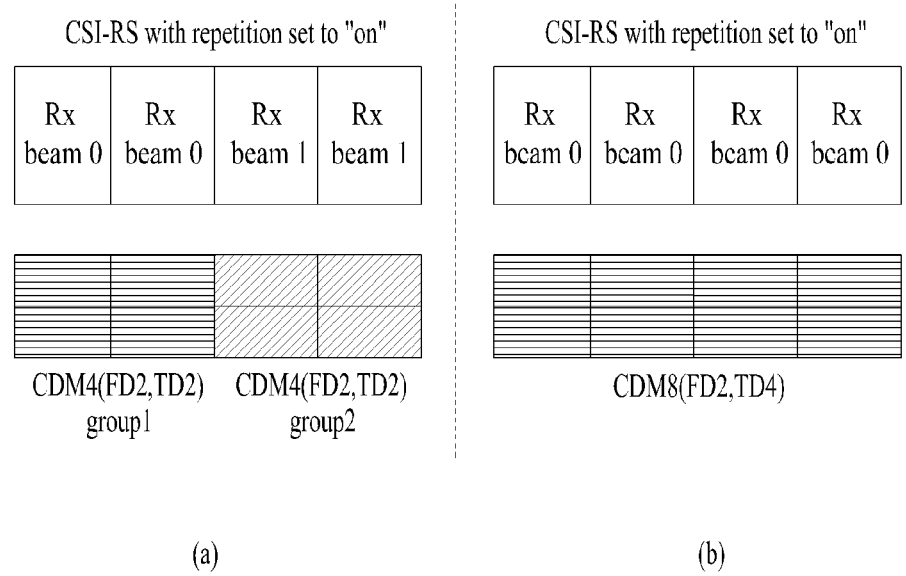
FIG. 26 illustrates reception at a UE when CSI-RS with different types or configurations are multiplexed.

When CSI-RS resources included in a CSI-RS resource set where the higher layer parameter 'repetition' is set to 'ON' are FDM with CSI-RS resources for CSI acquisition where repetition is not configured, the Rx beam sweeping of the UE may be defined or limited in consideration of the OCC to guarantee the performance of the CSI acquisition. For example, when CSI-RS resources included in a CSI-RS resource set where the higher layer parameter 'repetition' is set to 'ON' are FDM with CSI-RS resources for CSI acquisition where repetition is not configured, it may be expected/assumed that the UE performs no Rx beam sweeping or Rx beam refinement on N OFDM symbols spanned by one CDM groups (where N=1, 2, 4, 8, . . . ). This operation may be indicated or configured by the BS. For example, referring to FIG. 26, the UE may change the Rx beam at the time of switching from CDM4 group 1 to CDM4 group 2, and this operation may be configured or indicated by the BS.

When CSI-RS resources included in a CSI-RS resource set where the higher layer parameter 'repetition' is set to 'OFF' are FDM with CSI-RS resources for CSI acquisition where repetition is not configured, the UE may not expect that the BS uses different transmission filters during N OFDM symbols spanned by one CDM groups (where N=1, 2, 4, 8, . . . ). That is, the UE may expect that the BS does not change the transmission filter in OFDM symbols corresponding to one CDM group. In other words, the UE may expect that the BS does not change the Tx beam in OFDM symbols corresponding to one CDM group.

Alternatively, when the CDM type of CSI-RS resources included in a CSI-RS resource set where repetition is not configured is FD-CDM2 or when the CSI-RS resources has a CDM type where one OFDM symbol is spanned as in FD-CDM4, the UE may expect and assume that the CSI-RS resources are transmitted in the same OFDM symbols as CSI-RS resources included in a CSI-RS resource set where repetition is set to 'ON' or 'OFF'. The above-described operation may be configured or indicated by the BS.

When CSI-RS resources included in a CSI-RS resource set where repetition is set to 'OFF' are transmitted in the same OFDM symbols as CSI-RS resources for CSI acquisition or CSI-RS resources for time-frequency tracking, the UE may not expect or assume that the BS will use a different transmission filter for each symbol. In other words, the UE may expect that the BS performs no beam sweeping or beam refinement per symbol in the same OFDM symbols. The above-described operation may be configured or indicated by the BS. If the BS performs the beam sweeping for each OFDM symbol and the UE receives the CSI-RS for CSI acquisition based thereon, there may be a problem in the CSI measurement. For example, the OCC configured over two or four OFDM symbols may be broken.

Alternatively, when CSI-RS resources included in a CSI-RS resource set where repetition is set to CON' are transmitted in the same OFDM symbols as CSI-RS resources for CSI acquisition or CSI-RS resources for time-frequency tracking, the UE may expect, assume, or perform no Rx beam sweeping or Rx beam refinement in the same OFDM symbols. Alternatively, it may not be assumed or expected that the UE uses a different reception filter for each of the same OFDM symbols. The above-described operation may be configured or indicated by the BS. If the UE performs the Rx beam sweeping for each symbol and receives the CSI-RS for CSI acquisition, there may be a problem in the CSI measurement. For example, the OCC configured over two or four OFDM symbols may be broken.

Embodiment 3

Since the PDCCH is quite frequently in a mini-slot or non-slot including 2/4/7 OFDM symbols, three or more RSs and channels such as the CSI-RS, SS/PBCH block, and PDCCH may be multiplexed and transmitted in the same OFDM symbol(s). Hereinafter, how the UE operates in this situation will be described based on whether the Rx beam sweeping is allowed for each RS, which has been described in Embodiment 2. According to Embodiment 3, the UE may operate as follows for multiplexing between the CSI-RS, SS/PBCH block, and PDCCH. The UE operations may be indicated or configured by the BS.

When the PDCCH is transmitted in OFDM symbol(s) where the SS/PBCH block is transmitted together with the CSI-RS, and more particularly, the CSI-RS for BM, the UE may expect, assume, or perform no Rx beam refinement or Rx beam sweeping. Alternatively, the BS may instruct the UE not to perform the Rx beam sweeping.

Alternatively, if the Rx beam sweeping is considered important, the UE may not expect or assume that the PDCCH is transmitted in OFDM symbol(s) where the CSI-RS for BM is transmitted together with the SS/PBCH block except an SS/PBCH block for BFD. That is, it may be assumed that the PDCCH is TDM with the CSI-RS for BM and SS/PBCH block except the SS/PBCH block for BFD. This may be interpreted to mean that simultaneous reception of the CSI-RS and SS/PBCH block is prioritized over reception of the PDCCH. Also, it may be interpreted to mean that the Rx beam sweeping is prioritized over the PDCCH reception.

Alternatively, it may be expected or assumed that the PDCCH is transmitted in OFDM symbols where the SS/PBCH block for BFD is simultaneously transmitted with the CSI-RS for BFD, CSI-RS for CSI acquisition, or CSI-RS for time-frequency tracking among SS/PBCH blocks and CSI-RSs used for various purposes. In this case, the Rx beam sweeping where the UE changes the Rx beam for each OFDM symbol may be limited.

Alternatively, the UE may expect or assume that CSI-RS resources included in a CSI-RS resource set where repetition is set to 'OFF' are not transmitted in OFDM symbols where the PDCCH and SS/PBCH block are transmitted together. This may be interpreted to mean that reception of the CSI-RS for BM is deprioritized under simultaneous reception of the SS/PBCH block and PDCCH.

Alternatively, the UE may expect or assume that the CSI-RS for BM is not transmitted in OFDM symbols where the PDCCH and SS/PBCH block for BFD are transmitted together. For example, the UE may expect or assume that only the CSI-RS for CSI acquisition and/or CSI-RS for time-frequency tracking is capable of being transmitted in the OFDM symbols where the PDCCH and SS/PBCH block for BFD are transmitted together.

Alternatively, the UE may assume or expect that the PDCCH is not transmitted in OFDM symbols where any one of the SS/PBCH blocks for BM, RRM, and RLM is transmitted together with the CSI-RS for BM, and more particularly, CSI-RS resources included in a CSI-RS resource set where repetition is set to 'ON'.

In other words, when the PDCCH is transmitted in the OFDM symbols where any one of the SS/PBCH blocks for BM, RRM, and RLM is transmitted together with the CSI-RS for BM, and more particularly, the CSI-RS resources included in the CSI-RS resource set where repetition is set to 'ON', the PDCCH reception may be considered less important than reception of the SS/PBCH block and CSI-RS. In other words, it may be interpreted to mean that the UE give a higher priority to the Rx beam sweeping.

Alternatively, when the SS/PBCH block for BFD, CSI-RS for BM, and PDCCH are configured to be transmitted in the same OFDM symbols, the reception of the CSI-RS for BM may be considered less important than the reception of the SS/PBCH block and PDCCH. For example, the BS may instruct the UE not to perform the Rx beam sweeping.

Alternatively, the UE may expect or assume that the CSI-RS for BM is not transmitted in OFDM symbols where the SS/PBCH block for BFD and PDCCH are transmitted. This may be interpreted to mean that receiving the SS/PBCH block for BFD and PDCCH is prioritized over receiving the CSI-RS for BM.

Alternatively, the UE may expect that regarding all types of CSI-RSs such as the CSI-RS for CSI acquisition, CSI-RS for BM, CSI-RS for time-frequency tracking, CSI-RS for RRM, and CSI-RS for BFD and all types of SS/PBCH blocks, the CSI-RS, SS/PBCH block, and PDCCH are not transmitted in the same OFDM symbols.

Alternatively, when the SS/PBCH block is spatially QCLed with the CSI-RS for BM, the UE may expect or assume that the SS/PBCH block and CSI-RS are transmitted in the same OFDM symbols. When a non-slot or mini-slot is configured/defined/indicated in a symbol duration of the OFDM symbols where the SS/PBCH block and CSI-RS are transmitted, all of the PDCCH, SS/PBCH block, and CSI-RS may be transmitted together. In this case, the UE may expect/assume that the Rx beam sweeping or Rx beam refinement will not be performed on the OFDM symbols. In other words, the UE may expect or assume that the same reception filter will be used during the OFDM symbols. The above-described UE operation may be indicated or configured by the BS. In particular, the operation may be important in the case of the non-slot. In this case, the UE may assume/expect that the PDCCH is spatially QCLed with the CSI-RS for BM and/or SS/PBCH block.

When the SS/PBCH block and CSI-RS for BM are spatially QCLed, the UE may expect or assume that the SS/PBCH block and CSI-RS will be transmitted in the same OFDM symbols. When the non-slot or mini-slot is configured/defined/indicated in the OFDM symbols where the SS/PBCH block and CSI-RS are transmitted, all of the PDCCH, SS/PBCH block, and CSI-RS may be transmitted. In this case, the UE may expect or assume that the BS will not use different transmission filters in the OFDM symbols. For example, the UE may expect/assume that the BS does not change the Tx beam in the OFDM symbols. In particular, the operation may be important in the case of the non-slot. In this case, the UE may assume/expect that the PDCCH is spatially QCLed with the CSI-RS for BM and/or SS/PBCH block.

Embodiment 3 may be extended and/or applied equally/similarly when the PDSCH is used rather than the PDCCH.

Different RSs and channels may be transmitted all together in three or more OFDM symbols. For example, when the non-slot is configured, the PDCCH, SS/PBCH block, and CSI-RS may be FDM and transmitted. In this case, the BS may group RSs and/or channels, which are simultaneously transmitted depending on types and configurations, (e.g., CSI-RS for CSI acquisition, CSI-RS for BM, CSI-RS for time-frequency tracking, CSI-RS for RRM, DMRS, SS/PBCH block for RRM, SS/PBCH block for BM, SS/PBCH block for BFD, etc.) into one or more RS groups based on the number of Rx beams that can be simultaneously used by the UE. Then, the BS may configure spatial QCL for each RS group.

The BS may configure/indicate for/to the UE the priority of a specific RS group. Specifically, when the number of beams that can be received by the UE is smaller than the number of configured/indicated RS groups, the BS may indicate/configure to/for the UE the priority of a specific group based thereon. These RS groups may be transmitted on the same CC or BWP or on different CCs or BWPs. For example, when the CSI-RS, PDCCH, and SS/PBCH block #1 are transmitted in the same OFDM symbols, the CSI-RS and SS/PBCH block #1 may be spatially QCLed, and the spatial QCL reference of the PDCCH may be set to other SS/PBCH blocks such as SS/PBCH block #0.

Embodiment 4

(1) When an aperiodic CSI-RS is configured, the UE may be configured with 14 or more CSI-RS resources in a single CSI-RS resource set. Since CSI-RS resources included in a CSI-RS resource set where CSI-RS-ResourceRep is set to 'ON' (for example, a CSI-RS resource set where the higher layer parameter repetition is set to 'ON') needs to be TDM, the 14 or more CSI-RS resources may not be defined/configured in one slot including 14 OFDM symbols. Thus, an offset needs to be configured for each CSI-RS resource, but in the case of the current aperiodic CSI-RS, there is a constraint that a slot offset needs to be configured for each resource set. To solve the above issue, the present disclosure propose the following embodiments.

When a slot offset is configured for CSI-RS resource(s) where the time-domain behavior of the configured CSI-RS is aperiodic, a higher layer parameter CSI-ResourcePeriodicityAndOffset may be used. Here, the higher layer parameter CSI-ResourcePeriodicityAndOffset is used to configure the periodicity and slot offset of a periodic CSI-RS. For example, among the periodicity and slot offset configured by CSI-ResourcePeriodicityAndOffset, the periodicity may be discarded, and only the slot offset may be used to configure the slot offset of the aperiodic CSI-RS resources. Details of the higher layer parameter CSI-ResourcePeriodicityAndOffset may be found in 3GPP TS 38.331.

When the time-domain behavior is aperiodic, if the slot offset of the CSI-RS resource is not configured, the value of the slot offset is set to 0. If the slot offset is configured, the BS may set the default value of the slot offset to 1. In addition, when the slot offset of aperiodic CIS-RS resources are configured, the default value of the slot offset may be fixed to 1.

Alternatively, when repetition is set to 'ON' for an aperiodic CSI-RS resource set, if the time-domain behavior is aperiodic, the UE may not expect/assume that the number of CSI-RS resources in the configured CSI-RS resource set is more than or equal to 14. If the number of CSI-RS resources is more than or equal to 14, the UE may consider only 14 CSI-RS resources with the smallest IDs and discard the remaining CSI-RS resources. When repetition is set to 'ON' for the aperiodic CSI-RS resource set, the BS may limit a maximum number of CSI-RS resources configurable in one CSI-RS resources set to 14.

Alternatively, when repetition is set to 'ON' for the aperiodic CSI-RS resource set, if the time-domain behavior is aperiodic and the number of CSI-RS resources is more than or equal to 14, the UE may assume that CSI-RS resources (e.g., CSI-RS resources #15 and #16) except the 14 CSI-RS resources with the lowest CSI-RS resource ID indices may be transmitted in a slot next to a slot in which the 14 CSI-RS resources with the lowest CSI-RS resource ID indices are transmitted, that is, a slot adjacent to the slot in which the 14 CSI-RS resources with the lowest CSI-RS resource ID indices are transmitted. Alternatively, the UE may automatically recognize/assume that the slot offset of the 14 CSI-RS resources with the lowest CSI-RS resource ID indices is set to 0 or not be configured, but the slot offset of the remaining CSI-RS resources is set to 1. For example, the UE may recognize that the default value of the slot offset of the remaining CSI-RS resources except the 14 CSI-RS resources with the lowest CSI-RS resource ID indices is 1.

The UE may not expect/assume that the number of CSI-RS resources included in the configured CSI-RS resource set is more than or equal to 14. If the number of CSI-RS resources is more than or equal to 14, the UE may consider only the 14 CSI-RS resources with the smallest IDs and discard the remaining CSI-RS resources.

(2) When a CSI-RS resource set is configured, if the time-domain behavior of a CSI-RS is aperiodic and the higher layer parameter TRS-Info is configured, that is, if the CSI-RS resource set is for time-frequency tracking, the UE may be configured with a total of four CSI-RS resources.

In this case, if the number of CSI-RS resources included in a CSI-RS resource set where the higher layer parameter TRS-Info is configured is 4, the UE may recognize/assume/expect that two CSI-RS resources with the lowest CSI-RS resource ID indices and two CSI-RS resources with the highest CSI-RS resource ID indices are transmitted in different adjacent slots.

The slot offset of the two CSI-RS resources with the highest CSI-RS resource ID indices may be set to the default value of 1. Alternatively, the UE may automatically recognize/assume that the slot offset of the two CSI-RS resources with the highest CSI-RS resource ID indices is 1.

Alternatively, when a slot offset is configured for CSI-RS resource(s) where the time-domain behavior of the configured CSI-RS is aperiodic, the higher layer parameter CSI-ResourcePeriodicityAndOffset for configuring the periodicity and slot offset of the periodic CSI-RS may be used. For example, among the periodicity and slot offset configured by CSI-ResourcePeriodicityAndOffset, the periodicity may be discarded, and only the slot offset may be used to configure the slot offset of the aperiodic CSI-RS resources. Details of the higher layer parameter CSI-ResourcePeriodicityAndOffset may be found in 3GPP TS 38.331.

Alternatively, the UE may expect/assume that at least two CSI-RS resource sets are capable of being triggered only when the higher layer parameter TRS-Info is configured. In other words, at least two CSI-RS resource sets may be simultaneously triggered only when the CSI-RS resource set is for time-frequency tracking. When the at least two CSI-RS resource sets where the higher layer parameter TRS-Info is configured are triggered at the same time, the UE may assume/expect that CSI-RS resources included in the two CSI-RS resource sets use the same antenna port.

Embodiment 5

In Embodiment 5, specific cases will be described regarding the UE operations and/or BS configurations/indications when two DL signals with different types and/or configurations are multiplexed, which are described above in Embodiment 2. That is, the following examples of Embodiment 5 may be combined with Embodiment 2. The examples of Embodiment 5 may be combined with Embodiment 3 for the UE operations and/or BS configurations/indications when three DL signal with different types and/or configurations are multiplexed. Further, Embodiment 5 may be combined with various embodiments of the present disclosure including Embodiments 2 and 3.

First, a multiplexing method between different CSI-RS resources will be described. If the CSI-RS for CSI acquisition and CSI-RS for BM are transmitted in different OFDM symbols at all times, the design of system/hardware may become simple. In other words, if the CSI-RS for CSI acquisition and CSI-RS for BM are always TDM, the system/hardware design may become simple.

However, since a CSI-RS resource set for BM may include up to 64 resources and multiple transmission reception points (TRPs) may simultaneously transmit the CSI-RS, the UE may need to be configured to perform both BM and CSI acquisition at the same time for efficient use of radio resources.

A CSI-RS resource for CSI acquisition may be configured over two or more symbols depending on the number of antenna ports. In this case, the UE may need to use the same Rx beam while performing CSI measurement on a specific CSI-RS resource. On the other hand, a CSI-RS resource in a CSI-RS resource set where the higher layer parameter repetition is set to 'ON' or 'OFF' occupies a single OFDM symbol, and the UE may use a different Rx beam for each CSI-RS resource. The UE operations and/or BS configurations/indications on different CSI-RS resources may be performed as follows in consideration of the above issues.

1) When the BS configures for the UE a specific CSI-RS resource for CSI acquisition and a CSI-RS resource set for BM where repetition=ON within the same slot, the BS may allocate two CSI resources to a specific one OFDM symbol for the UE. This configuration may be allowed only when the same spatial QCL is applied to the CSI-RS resource for CSI acquisition and CSI-RS resource(s) for BM.

In general, when CSI-RS resources in a CSI-RS resource set where repetition=ON and CSI-RS resources for CSI acquisition have the same spatial QCL configuration, the UE may be configured with the resources in the same OFDM symbol.

2) When CSI-RS resources for CSI acquisition and CSI-RS resources in a CSI-RS resource set where repetition is set to 'ON', that is, CSI-RS resources for BM configured for the Rx beam sweeping are transmitted in multiple OFDM symbols, the BS may instruct the UE not to perform the Rx beam sweeping during N (N>=2) OFDM symbols where the CSI-RS resources for CSI acquisition are configured.

For example, CSI-RS resource(s) where repetition is set to 'ON', which are configured together in OFDM symbol(s) where CSI-RS resource(s) for CSI acquisition are configured may be configured to follow a spatial QCL configuration configured for the CSI-RS resource(s) for CSI acquisition even though there is no spatial QCL configurations. Alternatively, the UE may automatically recognize such a configuration.

3) Regarding CSI-RS resource(s) in a CSI-RS resource set where repetition is set to 'OFF' (i.e., a CSI-RS where repetition is set to 'OFF'), it may be expected that the UE uses the same Tx beam while the BS performs the Tx beam sweeping. Thus, when CSI-RS resource(s) where repetition is set to 'OFF' are configured together in OFDM symbol(s) where CSI-RS resource(s) for CSI acquisition are configured, the UE may expect that the spatial QCL of the CSI-RS resource(s) where repetition is set to 'OFF' follows the spatial QCL configuration of the CSI-RS resource(s) for CSI acquisition, which are transmitted in the same OFDM symbol(s). This operation may be configured/indicated by the UE for/to the UE, or the UE may automatically recognize the operation.

The above-described embodiment may be equally applied when there is no spatial QCL configuration for the CSI-RS resource where repetition is set to 'OFF' and when the CSI-RS resource where repetition is set to 'OFF' has a different spatial QCL configuration from the CSI-RS resource for CSI acquisition.

4) When it is configured/indicated that a CSI-RS where the higher layer parameter repetition is set to 'ON' and a CSI-RS where repetition is set to 'OFF' are transmitted together in at least one OFDM symbol, the UE may request the BS to perform reconfiguration such that the CSI-RS where repetition is set to 'ON' and the CSI-RS where repetition is set to 'OFF' are not configured in the same OFDM symbol(s), by considering that the number of reception panels or the number of beams that can be simultaneously received by the UE is 1. In other words, when the number of reception panels or the number of beams that can be simultaneously received by the UE is 1, the UE may request the BS to transmit the CSI-RS where repetition is set to 'ON' and the CSI-RS where repetition is set to 'OFF' in different OFDM symbols.

In the following, a multiplexing method between the SS/PBCH block and the PDSCH or PDCCH will be described.

Table 7 shows rules for simultaneous transmission of the SS/PBCH block and the PDSCH or PDCCH for FR2.

TABLE 7

|  | SS/PBCH block-RRM | SS/PBCH block-RLM | SS/PBCH block-BFD | SS/PBCH block-BM |
| --- | --- | --- | --- | --- |
| PDSCH | scheduling restriction (no rate matching) | scheduling restriction | scheduling restriction/ QCL-D (CA) | scheduling restriction |
| PDCCH | Scheduling restriction (no rate matching) | scheduling restriction | scheduling restriction/ QCL-D (CA) | scheduling restriction |

In Table 7, QCL-D (CA) means that the scheduling restriction is not applied to OFDM symbols in the SS/PBCH block for BFD when the SS/PBCH block for BFD and PDSCH/PDCCH are configured with the same spatial QCL in the case of CA, which can be inferred from clause 8.5.7.3 of 3GPP TS 38.133.

The scheduling restriction in Table 7 may be applied within an SS/PBCH block measurement timing configuration (SMTC) window. The scheduling restriction may be applied to OFDM symbols in the SS/PBCH block when the UE performs SS/PBCH block based RLM, SS/PBCH block based BFD, and SS/PBCH block based L1-RSRP measurement outside the SMTC window. Thus, whether rate matching is defined on symbols for SS/PBCH block-RLM, SS/PBCH block-BFD, and SS/PBCH block-BM needs to be discussed.

Compared to the PDCCH, OFDM symbols for the PDSCH may be dynamically scheduled by DCI so that they do not partially or fully overlap with OFDM symbols for the SS/PBCH block within a slot. However, since the PDCCH is configured semi-statically, it may be difficult for the network to always guarantee the PDCCH to be configured with no overlap with one or more OFDM symbols where the SS/PBCH block is received within a slot.

When the OFDM symbols for the PDCCH overlap with the OFDM symbols for the SS/PBCH block, if the UE does not decode the PDCCH, this may result in inefficient use of resources and a loss in PDSCH scheduling opportunities. Therefore, in the case of the PDCCH, PDCCH REs should not be mapped to OFDM symbols in which SS/PBCH blocks are configured for RLM and L1-RSRP measurement. In other words, if SS/PBCH blocks transmitted outside the SMTC window for FR2 are for RLM and L1-RSRP measurement, the PDCCH may not be mapped to OFDM symbols configured for the SS/PBCH blocks.

Figure 27:
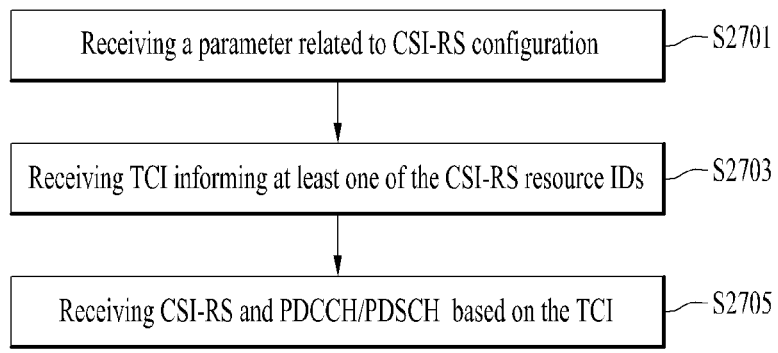
FIGS. 27 to 29 are diagrams for explaining an embodiment in which a CSI-RS and a PDCCH/PDSCH (physical downlink shared channel) are multiplexed and transmitted according to the present disclosure.
Figure 28:
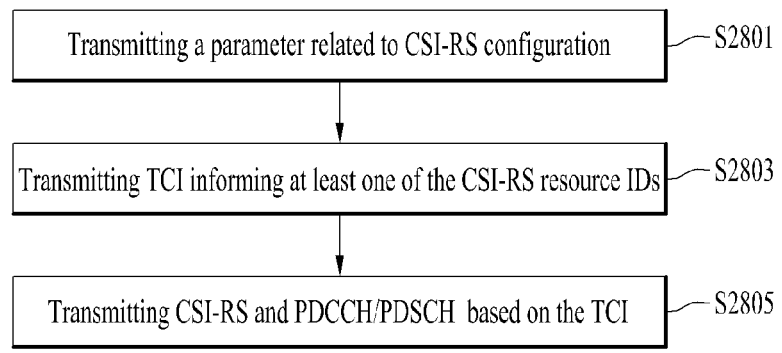
Figure 29:
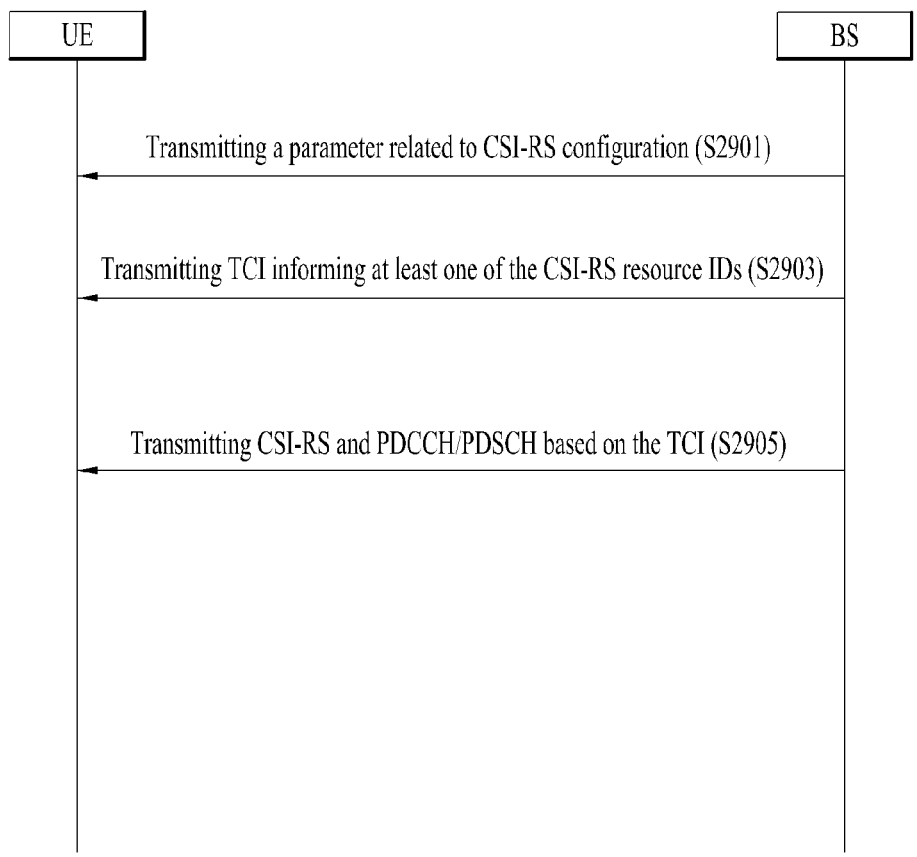

FIGS. 27 to 29 are diagrams for explaining UE, BS, and network operations when a CSI-RS and a PDCCH/PDSCH are multiplexed and transmitted.

The UE operations according to an embodiment of the present disclosure will be described with reference to FIG. 27. The UE may receive a CSI-RS configuration related parameter from the BS (S2701). The parameter may include parameters named 'repetition' and "TRS-info" for configuring the usage of the CSI-RS.

The UE may receive a transmission configuration indicator (TCI) including at least one CSI-RS resource identification (ID) from the BS (S2703). In this case, the TCI may be included in DCI.

Thereafter, the UE may receive the CSI-RS and PDCCH/PDSCH based on the TCI (S2705). In this case, the CSI-RS and PDCCH/PDSCH may be multiplexed in the same time region. Particular methods for receiving the CSI-RS and PDCCH/PDSHC in steps S2701 to S2705 will be described in the following embodiment.

The BS operations according to an embodiment of the present disclosure will be described with reference to FIG. 28.

Referring to FIG. 28, the BS may transmit a CSI-RS configuration related parameter (S2801). The parameter may include parameters named 'repetition' and "TRS-info" for configuring the usage of the CSI-RS. The BS may transmit a TCI including at least one CSI-RS resource ID (S2803). In this case, the TCI may be included in DCI. That is, the BS may transmit the TCI including the at least one CSI-RS resource ID in the DCI.

The BS may transmit the CSI-RS and PDCCH/PDSCH based on the TCI (S2805). In this case, the CSI-RS and PDCCH/PDSCH may be multiplexed in the same time region and transmitted. Particular methods for transmitting the CSI-RS and PDCCH/PDSHC in steps S2801 to S2805 will be described in the following embodiment.

FIG. 29 shows the network operations according to an embodiment of the present disclosure. Referring to FIG. 29, the BS may transmit a CSI-RS configuration related parameter to the UE (S2901). The parameter may include parameters named 'repetition' and "TRS-info" for configuring the usage of the CSI-RS. The BS may transmit to the UE a TCI including at least one CSI-RS resource ID (S2903). In this case, the TCI may be included in DCI. That is, the BS may transmit to the UE the TCI including the at least one CSI-RS resource ID in the DCI.

The BS may transmit to the UE the CSI-RS and PDCCH/PDSCH based on the TCI (S2905). In this case, the CSI-RS and PDCCH/PDSCH may be multiplexed in the same time region and transmitted to the UE. That is, the CSI-RS and PDCCH/PDSCH may be FDM and transmitted. Particular methods for transmitting the CSI-RS and PDCCH/PDSHC in steps S2801 to S2805 will be described in the following embodiment.

Particular methods for operating the UE, BS, and network will be described with reference to FIGS. 27 to 29.

Table 8 shows rules for simultaneous transmission of the CSI-RS and PDCCH/PDSCH in FR 2.

TABLE 8

| | CSIRS-BM (repetition "on") m the" | CSIRS-BM (repetition "off") | CSIRS-CSI | CSIRS-tracking |
|---|---|---|---|---|
| PDSCH | scheduling restriction(details are FFS) | FFS | FFS | FFS |
| PDCCH | Not configured | QCL-D | QCL-D | QCL-D |

Referring to Table. 8, the UE may be configured to receive the CSI-RS and PDCCH in the same OFDM symbols if the CSI-RS and PDCCH are spatially QCLed. If no spatial QCL is configured for a CSI-RS resource, the UE may freely choose its Rx beam for the CSI-RS resource.

If the UE receives the CSI-RS and PDCCH in the same OFDM symbols based on the spatial QCL of the PDCCH even though no QCL is configured for the CSI-RS, the Rx beam for the CSI-RS resource may be different from that for the PDCCH so that there may be a collision between the CSI-RS reception and PDCCH reception.

To simplify UE operations, FDM may be applied between the CSI-RS and PDCCH only when the CSI-RS and PDCCH are spatially QCLed. That is, the FDM between the CSI-RS and PDCCH may be supported only when the spatial QCL reference of the CSI-RS is equal to the spatial QCL reference for the PDCCH that is explicitly indicated.

Regarding the issue whether the CSI-RS where repetition is set to 'ON' and PDSCH are FDM and transmitted, PDSCH scheduling is restricted because the UE is expected to perform Rx beamforming during transmission of the CSI-RS based on L1-RSRP measurement on an FR2 serving cell when repetition of the CSI-RS resource set is 'ON'.

Similar to FDM between the SS/PBCH block and PDSCH for transmission thereof, the PDSCH may be dynamically scheduled by DCI so that the network may schedule the PDSCH not to overlap with CSI-RS resources of a CSI-RS resource set where repetition is set to 'ON'. It may be difficult to find reasons for introducing symbol-level PDSCH rate matching despite of an increase in UE complexity. Therefore, the UE may not be expected to receive the PDSCH overlapping with one or more OFDM symbols for the CSI-RS where repetition is set to 'ON'.

Regarding multiplexing of the PDSCH and CSI-RS where repetition is set to 'OFF', it may be desirable to allow FDM between the PDSCH and CSI-RS resource(s) because the UE generally maintain a single Rx beam within a slot where repetition is set to 'OFF'.

However, in this case, to guarantee that the Rx beam for the PDSCH is the same as that for the CSI-RS, at least one CSI-RS resource ID in the CSI-RS resource set may be indicated by the TCI state for the PDSCH. In other words, the TCI for the PDSCH may include at least one CSI-RS resource ID among CSI-RS resources included in the CSI-RS resource set.

For example, the BS may inform the UE of CSI-RS resource(s) having the same Rx beam as the PDSCH through the TCI included in DCI scheduling the PDSCH. In addition, the UE may recognize the CSI-RS resource(s) having the same Rx beam as the PDSCH scheduled by the DCI, based on the state of the TCI. Then, the UE may use the Rx beam corresponding to the CSI-RS resource indicated by the TCI in order to receive the PDSCH.

Embodiment 6

The minimum bandwidth of a CSI-RS resource is determined as the minimum of 24 RBs and the corresponding BWP size. That is, the minimum bandwidth of the CSI-RS resource is defined by $\min(24, N^{size}_{Bwp})$. The CSI-RS bandwidth may be configured with the initial RB index (startingRB) and the number of RBs (nofRBs) occupied by a CSI-RS resource.

Table 9 shows related rules defined in specifications.

TABLE 9

If startingRB < $N_{BWP}^{start}$, the UE shall assume that the initial CRB index of the CSI-RS resource is $N_{initial\ RB} = N_{BWP}^{start}$, otherwise $N_{initial\ RB}$ = startingRB. If nrofRBs > $N_{BWP}^{size} + N_{BWP}^{start} - N_{initial\ RB}$, the UE shall assume that the bandwidth of the CSI-RS resource is $N_{CSI-RS}^{BW} = N_{BWP}^{size} + N_{BWP}^{start} - N_{initial\ RB}$, otherwise $N_{CSI-RS}^{BW}$ = nrofRBs. In all cases, the UE shall expect that $N_{CSI-RS}^{BW} \geq \min(24, N_{BWP}^{size})$.

Figure 30:
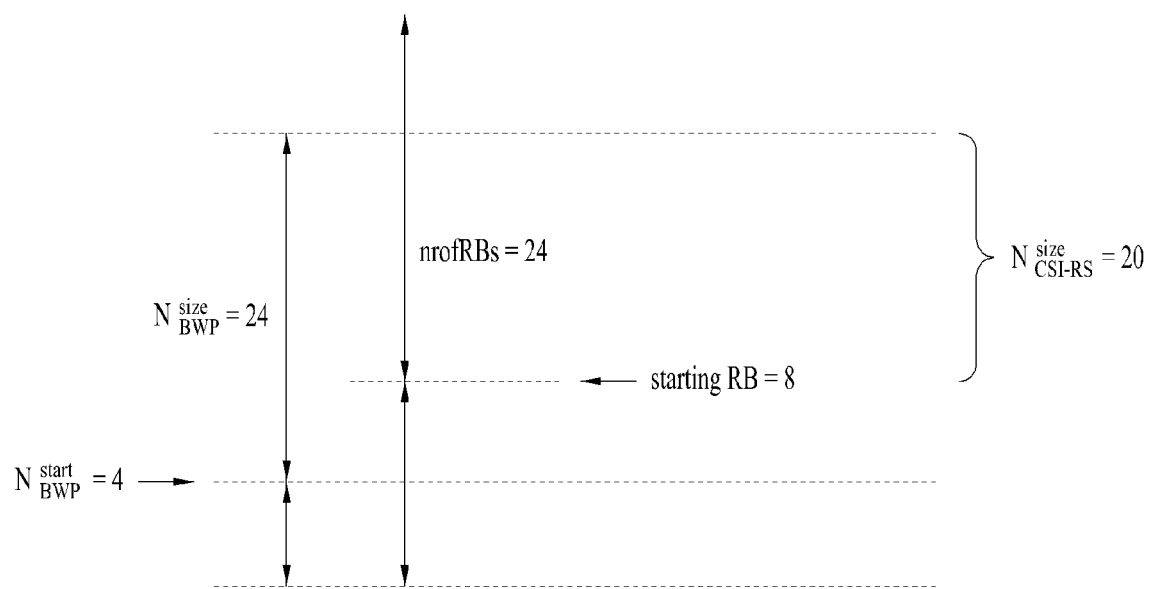
FIG. 30 is a diagram for explaining an embodiment for configuring a bandwidth for CSI-RS resources according to the present disclosure

According to Table 9, when startingRB>$N^{start}_{BWP}$ and $N^{size}_{Bwp}+N^{start}_{Bwp}$-startingRB<24, $N^{Bw}_{CSI-RS}$ is smaller than min(24, $N^{size}_{BWP}$), where $N^{Bw}_{CSI-RS}$ is the CSI-RS bandwidth, $N^{start}_{BWP}$ initial RB index of a BWP, and $N^{size}_{BWP}$ is the BWP size. FIG. 30 shows a case in which higher layer parameters are configured as follows: startingRB=8, nofRBs=24, $N^{start}_{BWP}$=4, and $N^{size}_{BWP}$=24. Referring to FIG. 30, since the initial RB index is 8 ($N_{initial\ RB}$=8), the CSI-RS bandwidth may be determined as follows: $N^{BW}_{CSI-RS}=N^{size}_{BWP}+N^{start}_{BWP}-N_{initial\ RB}$=20 RBs. The CSI-RS bandwidth may be obviously less than min (24, $N^{size}_{BWP}$).

Referring to Table 9, when the RB index (startingRB) where the CSI-RS bandwidth starts is higher than the RB index ($N^{start}_{BWP}$) where the BWP starts, the CSI-RS bandwidth may be extremely small. In addition, since the BWP size ($N^{size}_{BWP}$) may be allocated for each RB, the value of $N^{BW}_{CSI-RS}$ may decrease depending on the values of $N^{size}_{BWP}$, $N^{start}_{BWP}$, and startingRB. However, the CSI-RS bandwidth may need to be equal to or greater than a specific size for accurate CSI measurement and reporting.

When startingRB>$N^{start}_{BWP}$ and $N^{size}_{BWP}+N^{start}_{BWP}$-startingRB<24, the UE may automatically recognize that the initial RB index of the CSI-RS bandwidth spanned by a specific CSI-RS resource is set to an RB where the configured BWP starts. Table 9 may be modified into Table 10 in consideration of the above issues.

TABLE 10

If startingRB < $N_{BWP}^{start}$, or if startingRB > $N_{BWP}^{start}$ and $N_{BWP}^{size} + N_{BWP}^{start}$ - startingRB < 24, the UE shall assume that the initial CRB index of the CSI-RS resource is $N_{initial\ RB} = N_{BWP}^{start}$, otherwise $N_{initial\ RB}$ = startingRB. If nrofRBs > $N_{BWP}^{size} + N_{BWP}^{start} - N_{initial\ RB}$, the UE shall assume that the bandwidth of the TABLE 10-continued CSI-RS resource is $N_{CSI-RS}^{BW} = N_{BWP}^{size} + N_{BWP}^{start} - N_{initial\ RB}$, otherwise $N_{CSI-RS}^{BW} =$ nrofRBs. In all cases, the UE shall expect that $N_{CSI-RS}^{BW} \geq \min(24, N_{BWP}^{size})$.

In other words, even when the initial RB index (startingRB) of the CSI-RS bandwidth for a specific CSI-RS resource is configured within the BWP by RRC, the UE may assume that the starting point of the CSI-RS bandwidth is equal to that of the BWP based on the BWP size, the initial RB index of the BWP, and the value of startingRB. In consideration of the determined BWP size, this may be allowed only when the BWP size is less than a specific value.

Embodiments 1 to 6 above may be implemented independently, but two or more embodiments among Embodiments 1 to 6 may be combined and implemented. That is, Embodiments 1 to 6 of the present disclosure are classified for clarity of description. The present disclosure may be implemented by combining a plurality of embodiments without being limited to any one embodiment.

Figure 31:
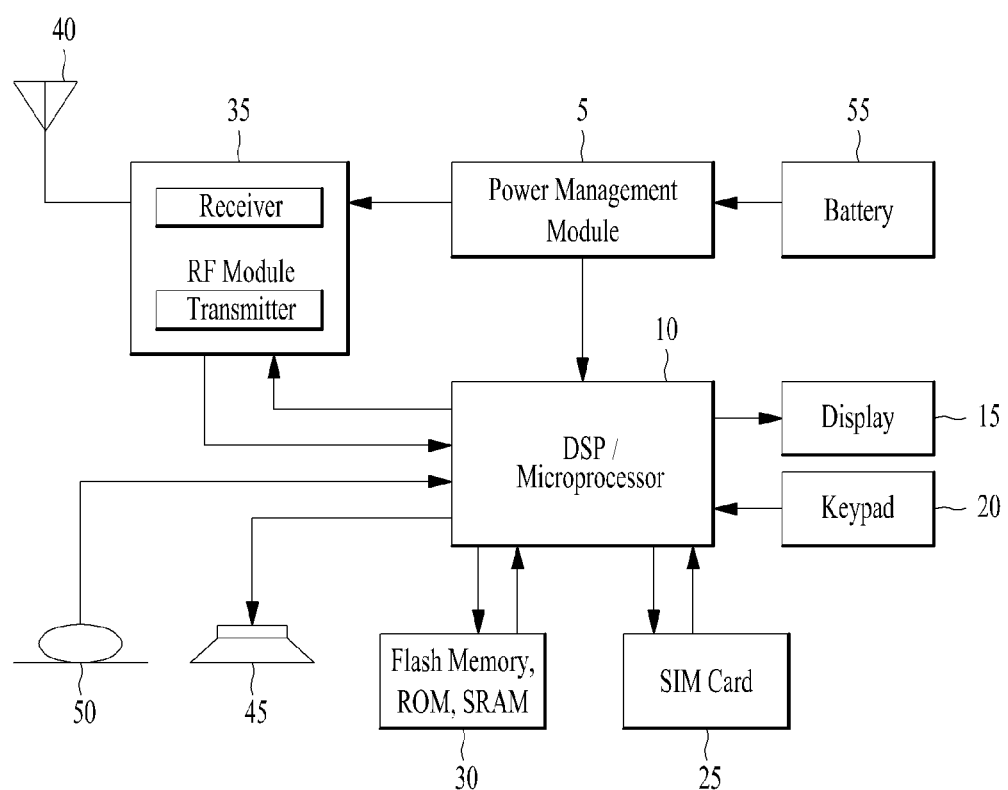
FIG. 31 is a block diagram illustrating components of a wireless device for implementing the present disclosure.

FIG. 31 illustrates an example of a wireless communication device according to an embodiment of the present disclosure.

The wireless communication device illustrated in FIG. 31 may represent a UE and/or a BS according to an embodiment of the present disclosure. However, the wireless communication device of FIG. 31 may be replaced with any of various types of devices such as a vehicle communication system or device, a wearable device, and a laptop, not limited to the UE and/or the BS according to the embodiment of the present disclosure. More specifically, the above device may be a BS, a network node, a Tx UE, an Rx UE, a wireless device, a wireless communication device, a vehicle, a vehicle having a self-driving function, an unmanned aerial vehicle (UAV), an artificial intelligence (AI) module, a robot, an augmented reality (AR) device, a virtual reality (VR) device, a machine-type communication (MTC) device, an Internet of things (IoT) device, a medical device, a FinTech device (or a financial device), a security device, a weather/environment device, or a device related to the fourth industrial revolution or a 5G service. The UAV may be, for example, an aircraft without a human being onboard, which aviates by a wireless control signal. The MTC device and the IoT device may be, for example, devices that do not require direct human intervention or manipulation and may include smartmeters, vending machines, thermometers, smartbulbs, door locks, or various sensors. The medical device may be, for example, a device used for the purpose of diagnosing, treating, relieving, curing, or preventing disease or a device used for the purpose of inspecting, replacing, or modifying a structure or a function and may include a device for treatment, a device for operation, a device for (in vitro) diagnosis, a hearing aid, or an operation device. The security device may be, for example, a device installed to prevent a danger that may arise and to maintain safety and may include a camera, a CCTV, or a black box. The FinTech device may be, for example, a device capable of providing a financial service such as mobile payment and may include a payment device or a point of sale (POS) system. The weather/environment device may be, for example, a device for monitoring or predicting a weather/environment.

The Tx UE or the Rx UE may include, for example, a cellular phone, a smartphone, a laptop computer, a digital broadcast terminal, a personal digital assistant (PDA), a portable multimedia player (PMP), a navigation system, a slate PC, a tablet PC, an ultrabook, a wearable device (e.g., a smartwatch, smartglasses, or a head mounted display (HMD)), or a foldable device. The HMD may be, for example, a type of display device that is worn on the head and may be used to implement VR or AR.

In the example of FIG. 31, the UE and/or the BS according to the embodiment of the present disclosure includes at least one processor 10 such as a digital signal processor or a microprocessor, a transceiver 35, a power management module 5, an antenna 40, a battery 55, a display 15, a keypad 20, a memory 30, a subscriber identity module (SIM) card 25, a speaker 45, and a microphone 50. In addition, the UE and/or the BS may include one or more antennas. The transceiver 35 may be also referred to as an RF module.

The at least one processor 10 may be configured to implement the functions, procedures and/or methods described with reference to FIGS. 1 to 30. In at least some of the embodiments described with reference to FIGS. 1 to 18, the at least one processor 10 may implement one or more protocols, such as layers of radio interface protocols (e.g., functional layers).

The memory 30 is coupled to the at least one processor 10 and stores information related to the operations of the at least one processor 10. The memory 30 may be located inside or outside the at least one processor 10 and may be coupled to the at least one processor 10 by various techniques such as wired or wireless communication.

A user may input various types of information (e.g., indication information such as a telephone number) by various techniques such as pressing a button on the keypad 20 or activating voice using the microphone 50. The at least one processor 10 executes appropriate functions such as receiving and/or processing information of the user and dialing a telephone number.

It is also possible to retrieve data (e.g., operational data) from the SIM card 25 or the memory 30 to execute the appropriate functions. In addition, the at least one processor 10 may receive and process global positioning system (GPS) information from a GPS chip to obtain location information about the UE and/or the BS such as in vehicle navigation, map service, or the like, or execute functions related to the location information. Further, the at least one processor 10 may display these various types of information and data on the display 15 for reference and user convenience.

The transceiver 35 is coupled to the at least one processor 10 to transmit and/or receive wireless signals such as RF signals. The at least one processor 10 may control the transceiver 35 to initiate communication and transmit wireless signals including various types of information or data, such as voice communication data. The transceiver 35 may include a receiver for receiving a wireless signal and a transmitter for transmitting a wireless signal. The antenna 40 facilitates the transmission and reception of wireless signals. In some embodiments, upon receipt of a wireless signal, the transceiver 35 may forward and convert the signal to a baseband frequency for processing by the at least one processor 10. The processed signal may be processed according to various techniques, such as being converted into audible or readable information, and output through the speaker 45.

In some embodiments, a sensor may also be coupled to the at least one processor 10. The sensor may include one or more sensing devices configured to detect various types of information, including velocity, acceleration, light, vibration, and the like. The at least one processor 10 receives and processes sensor information obtained from the sensor, such as proximity, position, image, and the like, thereby executing various functions such as collision avoidance and autonomous driving.

Various components such as a camera and a universal serial bus (USB) port may further be included in the UE and/or the BS. For example, a camera may further be coupled to the at least one processor 10, for use in various services including autonomous driving and vehicle safety services.

FIG. 31 merely illustrates one example of devices included in a UE and/or a BS, not limiting the present disclosure. For example, some components, such as the keypad 20, the GPS chip, the sensor, the speaker 45 and/or the microphone 50 may be excluded from UE and/or BS implementation in some embodiments.

Hereinafter, UE operations when the UE according to an embodiment of the present disclosure is equivalent to the wireless device shown in FIG. 31 will be described to implement embodiments of the present disclosure. When the UE is equivalent to the wireless device, the processor 10 may control the transceiver 35 to receive a TCI including at least one CSI-RS ID from a BS. In this case, the TCI may be included in DCI. The processor 10 may control the transceiver 35 to receive a CSI-RS and a PDCCH/PDSCH based on the TCI. In this case, the CSI-RS and PDCCH/PDSCH may be multiplexed in the same time region. The processor 10 may receive the CSI-RS and PDCCH/PDSCH according to the above-described embodiments of the present disclosure.

In addition, BS operations when the BS according to an embodiment of the present disclosure is equivalent to the wireless device shown in FIG. 31 will be described to implement embodiments of the present disclosure. The processor 10 may control the transceiver 35 to transmit a CSI-RS configuration related parameter. The parameter may include parameters named 'repetition' and "TRS-info" for configuring the usage of a CSI-RS. The processor 10 may control the transceiver 25 to transmit a TCI including at least one CSI-RS resource ID. In this case, the TCI may be included in DCI. That is, the processor 10 may control the transceiver 35 to transmit the TCI including the at least one CSI-RS resource ID in the DCI.

The processor 10 may control the transceiver 35 to transmit the CSI-RS and PDCCH/PDSCH based on the TCI. In this case, the CSI-RS and PDCCH/PDSCH may be multiplexed in the same time region and transmitted. The processor 10 may transmit the CSI-RS and PDCCH/PDSCH according to the above-described embodiments of the present disclosure.

Figure 32:
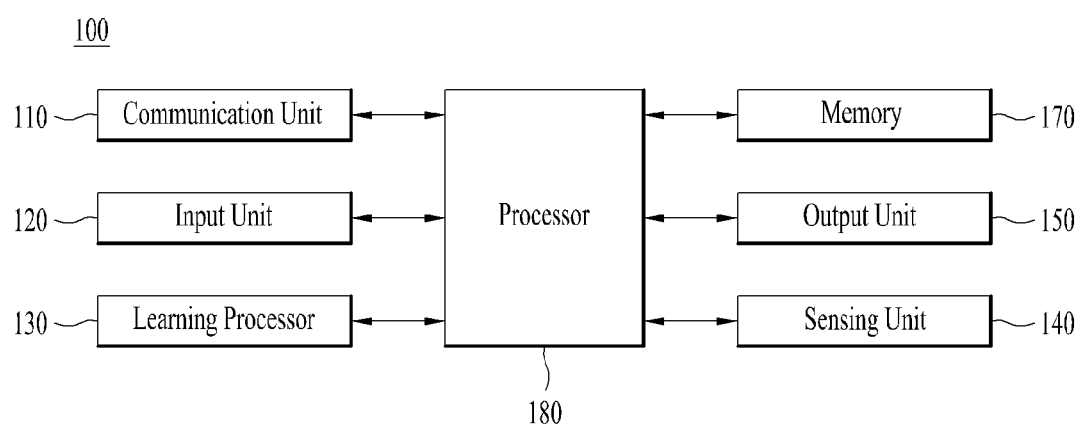
FIGS. 32, 33 and 34 are diagrams illustrating an AI apparatus and AI system according to an embodiment of the present disclosure.

FIG. 32 illustrates an AI device 100 according to an embodiment of the present disclosure.

The AI device 100 may be implemented by a stationary or mobile device, for example, a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a desktop computer, a digital signage, a robot, a vehicle, etc.

Referring to FIG. 32, the AI device 100 may include a communication unit 110, an input unit 120, a learning processor 130, a sensing unit 140, an output unit 150, a memory 170, and a processor 180.

The communication unit 110 may transmit and receive data to and from external devices such as an AI server 200 and other AI devices 100a to 100e based on wired or wireless communication technology. For example, the communication unit 110 may transmit and receive sensor information, user inputs, learning models, and control signals to and from the external devices.

The communication technology used by the communication unit 110 includes Global System for Mobile communication (GSM), Code Division Multiple Access (CDM), Long Term Evolution (LTE), 5G, Wireless Local Area Network (WLAN), Wireless Fidelity (Wi-Fi), Bluetooth™, Radio Frequency Identification (RFID), Infrared Data Association (IrDA), ZigBee, Near Field Communication (NFC), etc.

The input unit 120 may obtain various types of data.

The input unit 120 may include a camera for inputting a video signal, a microphone for receiving an audio signal, and a user input unit for receiving information from a user. The camera or microphone may be treated as a sensor, and the signal obtained from the camera or microphone may be considered as sensing data or sensor information.

The input unit 120 may obtain learning data for a learning model and input data to be used when an output is obtained based on the learning model. The input unit 120 may obtain raw input data. In this case, the processor 180 or learning processor 130 may extract an input feature by preprocessing the input data.

The learning processor 130 may train a model configured with an ANN based on the learning data. Here, the trained ANN may be referred to as the learning model. The learning model may be used to infer a result value for new input data rather than the learning data, and the inferred value may be used as a basis for determining whether to perform a certain operation.

In this case, the learning processor 130 may perform AI processing together with a learning processor 240 of the AI server 200.

The learning processor 130 may include a memory integrated with or implemented in the AI device 100. Alternatively, the learning processor 130 may be implemented with the memory 170, an external memory directly coupled to the AI device 100, or a memory in an external device.

The sensing unit 140 may obtain at least one of internal information of the AI device 100, surrounding environment information of the AI device 100, and user information using various sensors.

The sensor included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, a radar, and the like.

The output unit 150 may generate an output related to visual, audible, or tactile sense.

The output unit 150 may include a display unit for outputting visual information, a speaker for outputting audible information, a haptic module for outputting tactile information, and the like.

The memory 170 may store data supporting various functions of the AI device 100. For example, the memory 170 may store input data, learning data, learning models, learning histories, etc. obtained by the input unit 120.

The processor 180 may determine at least one executable operation of the AI device 100 based on information determined or generated by a data analysis algorithm or machine learning algorithm. The processor 180 may control the components of the AI device 100 to perform the determined operation.

To this end, the processor 180 may request, search for, receive, or employ data of the learning processor 130 or memory 170 and control the components of the AI device 100 to execute an expected or preferable operation or among the one or more executable operations.

If the processor 180 requires association with an external device to perform the determined operation, the processor 180 may generate a control signal for controlling the corresponding external device and transmit the generated control signal to the external device.

The processor 180 may obtain intention information from a user input and determine the intention of the user based on the obtained intention information.

In this case, the processor 180 may obtain the intention information corresponding to the user input using at least one of a speech-to-text (STT) engine for converting a voice input into a character string or a natural language processing (NLP) engine for obtaining intention information from a natural language.

At least one of the STT engine and the NLP engine may be configured with the ANN of which at least a part is trained according to the machine learning algorithm. At least one of the SIT engine and the NLP engine may be trained by the learning processor 130, by the learning processor 240 of the AI server 200, or by distributed processing thereof.

The processor 180 may collect history information including user feedback on the operation of the AI device 100 and details thereof. The processor 180 may store the history information in the memory 170 or learning processor 130 or transmit the history information to an external device such as the AI server 200. The collected history information may be used to update the learning model.

The processor 180 may control at least some of the components of the AI device 100 to drive an application program stored in the memory 170. Further, the processor 180 may operate two or more of the components included in the AI device 100 in combination to drive the application program.

Figure 33:
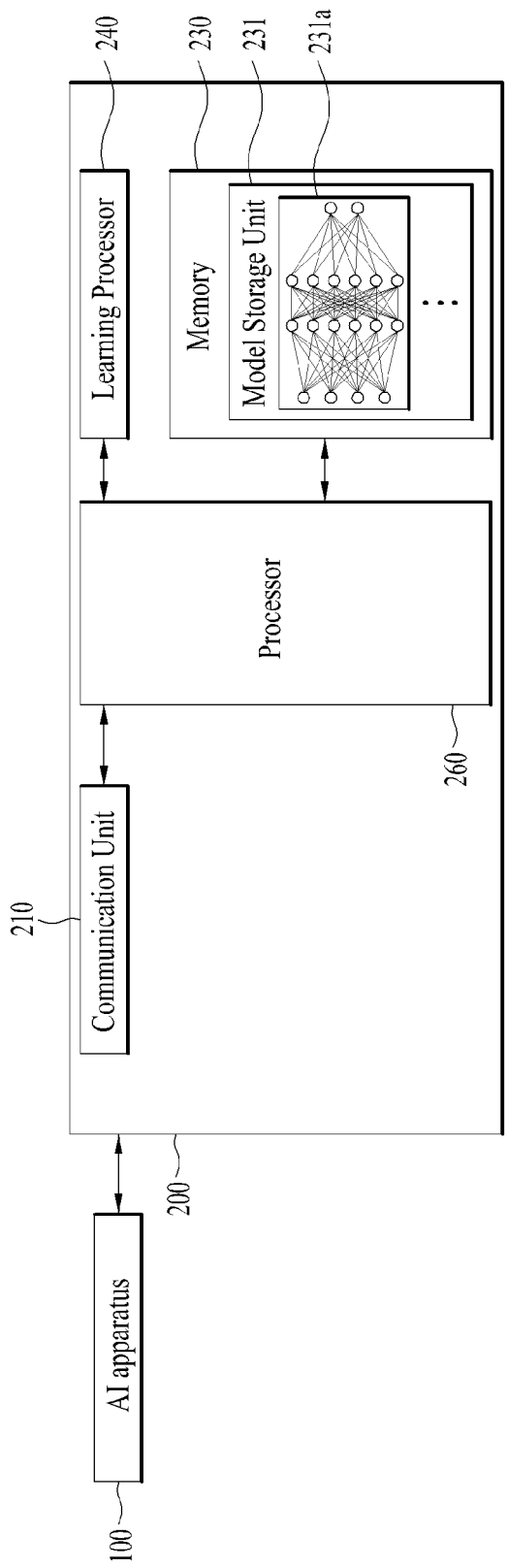

FIG. 33 illustrates the AI server 200 according to an embodiment of the present disclosure.

Referring to FIG. 33, the AI server 200 may mean a device for training an ANN based on a machine learning algorithm or a device for using a trained ANN. Here, the AI server 200 may include a plurality of servers to perform distributed processing or may be defined as a 5G network. The AI server 200 may be included as a part of the AI device 100 to perform at least part of AI processing together.

The AI server 200 may include a communication unit 210, a memory 230, the learning processor 240, a processor 260, and the like.

The communication unit 210 may transmit and receive data to and from an external device such as the AI device 100.

The memory 230 may include a model storage unit 231. The model storage unit 231 may store a model being trained or trained (or an ANN 231a) through the learning processor 240.

The learning processor 240 may train the ANN 231a based on learning data. The ANN, i.e., a learning model may be included in the AI server 200 or in an external device such as the AI device 100.

The learning model may be implemented by hardware, software or a combination thereof. If a part or the entirety of the learning model is implemented with software, one or more instructions for the learning model may be stored in the memory 230.

The processor 260 may infer a result value for new input data based on the learning model and generate a response or control command based on the inferred result value.

Figure 34:
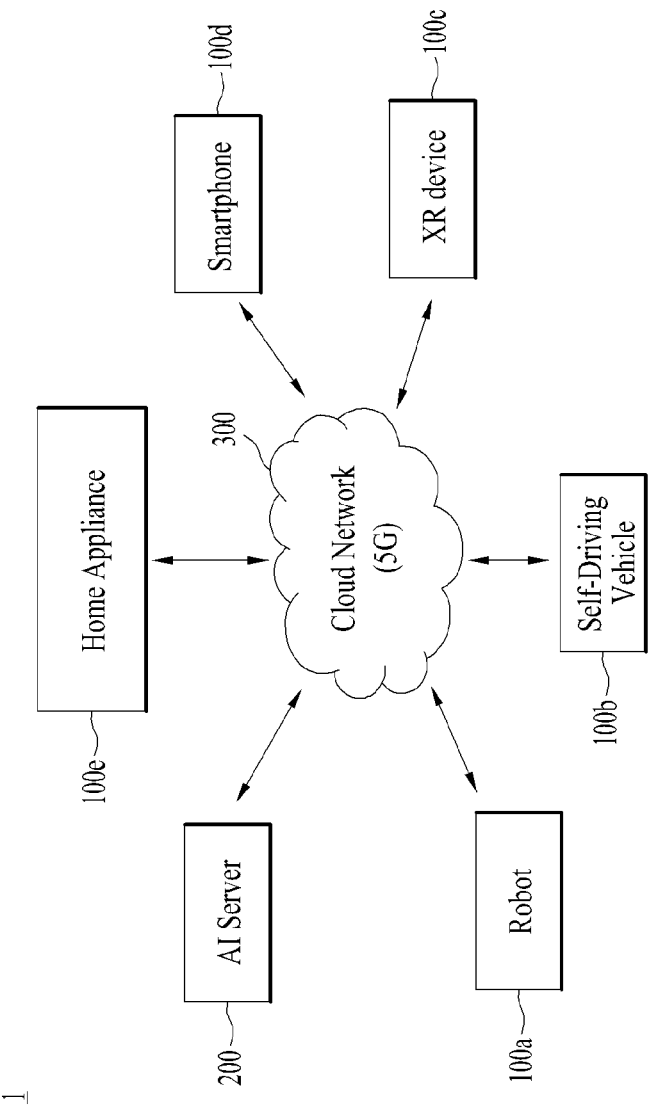

FIG. 34 illustrates an AI system 1 according to an embodiment of the present disclosure.

Referring to FIG. 34, at least one of the AI server 200, a robot 100a, an autonomous driving vehicle 100b, an XR device 100c, a smartphone 100d, and a home appliance 100e is connected to a cloud server 10 in the AI system 1. Here, the robot 100a, the autonomous vehicle 100b, the XR device 100c, the smartphone 100d, or the home appliance 100e, to which the AI technology is applied, may be referred to as an AI device 100a to 100e.

The cloud network 10 may refer to a network configuring part of a cloud computing infrastructure or a network existing in the cloud computing infrastructure. Here, the cloud network 10 may be configured with a 3G network, a 4G or LTE network, or a 5G network.

That is, each of the devices 100a to 100e and 200 included in the AI system 1 may be connected to each other through the cloud network 10. In particular, the devices 100a to 100e and 200 may communicate with each other through a BS or may communicate with each other directly without the BS.

The AI server 200 may include a server in charge of AI processing and a server in charge of big data computation.

The AI server 200 may be connected to at least one of the robot 100a, the autonomous vehicle 100b, the XR device 100c, the smartphone 100d, or the home appliance 100e included in the AI system 1 via the cloud network 10 and help at least part of AI processing of the connected AI devices 100a to 100e.

In this case, the AI server 200 may train an ANN according to a machine learning algorithm on behalf of the AI devices 100a to 100e and directly store or transmit a learning model to the AI devices 100a to 100e.

The AI server 200 may receive input data from the AI devices 100a to 100e, infer a result value for the received input data based on the learning model, generate a response or control command based on the inferred result value, and transmit the response or control command to the AI devices 100a to 100e.

Alternatively, the AI devices 100a to 100e may directly infer the result value for the input data based on the learning model and generate the response or control command based on the inferred result value.

Hereinafter, various embodiments of the AI devices 100a to 100e to which the above-described technology is applied will be described. The AI devices 100a to 100e illustrated in FIG. 22 may be considered as a specific example of the AI device 100 illustrated in FIG. 20.

<AI+Robot>

If the AI technology is applied to the robot 100a, the robot 100a may be implemented as a guide robot, a transport robot, a cleaning robot, a wearable robot, an entertainment robot, a pet robot, an unmanned flying robot, etc.

The robot 100a may include a robot control module for controlling an operation, and the robot control module may refer to a software module or a chip implemented by hardware.

The robot 100a may obtain state information of the robot 100a, detect (recognize) a surrounding environment and objects, generate map data, determine a travel route or driving plan, or determine a response or action to user interaction by using sensor information obtained from various types of sensors.

To determine the travel route or driving plan, the robot 100a may use sensor information obtained from at least one of the following sensors: a LIDAR, a radar, and a camera to determine a movement route and a travel plan.

The robot 100a may perform the above-described operations based on a learning model configured with at least one ANN. For example, the robot 100a may recognize the surrounding environment and objects based on the learning model and determine an operation based on the recognized surrounding environment or object. Here, the learning model may be directly trained by the robot 100a or by an external device such as the AI server 200.

The robot 100a may operate by directly generating a result based on the learning model. Alternatively, the robot 100a may transmit sensor information to the external device such as the AI server 200 and receive a result generated based on the sensor information.

The robot 100a may determine the travel route and driving plan based on at least one of the map data, the object information detected from the sensor information, or the object information obtained from the external device. Then, the robot 100a may move according to the determined travel path and driving plan under control of its driving unit.

The map data may include object identification information about various objects placed in a space in which the robot 100a moves. For example, the map data may include object identification information about fixed objects such as walls and doors and movable objects such as flower pots and desks. The object identification information may include a name, a type, a distance, a position, etc.

The robot 100a may operate and move by controlling the driving unit based on the user control/interaction. In this case, the robot 100a may obtain intention information from the motion or speech of the user and determine a response based on the obtained intention information.

<AI+Autonomous Driving>

If the AI technology is applied to the autonomous driving vehicle 100b, the autonomous driving vehicle 100b may be implemented as a mobile robot, a vehicle, an unmanned flying vehicle, etc.

The autonomous driving vehicle 100b may include an autonomous driving control module for controlling the autonomous driving function, and the autonomous driving control module may refer to a software module or a chip implemented by hardware. The autonomous driving control module may be included in the autonomous driving vehicle 100b as a component thereof, but it may be implemented with separate hardware and connected to the outside of the autonomous driving vehicle 100b.

The autonomous driving vehicle 100b may obtain state information about the autonomous driving vehicle 100b based on sensor information acquired from various types of sensors, detect (recognize) a surrounding environment and objects, generate map data, determine a travel route and driving plan, or determine an operation.

Similarly to the robot 100a, the autonomous driving vehicle 100b may use the sensor information obtained from at least one of the following sensors: a LIDAR, a radar, and a camera so as to determine the travel route and driving plan.

In particular, the autonomous driving vehicle 100b may recognize an environment and objects in an area hidden from view or an area over a certain distance by receiving the sensor information from external devices. Alternatively, the autonomous driving vehicle 100b may receive information, which is recognized by the external devices.

The autonomous driving vehicle 100b may perform the above-described operations based on a learning model configured with at least one ANN. For example, the autonomous driving vehicle 100b may recognize the surrounding environment and objects based on the learning model and determine the driving path based on the recognized surrounding environment and objects. The learning model may be trained by the autonomous driving vehicle 100a or an external device such as the AI server 200.

The autonomous driving vehicle 100b may operate by directly generating a result based on the learning model. Alternatively, the autonomous driving vehicle 100b may transmit sensor information to the external device such as the AI server 200 and receive a result generated based on the sensor information.

The autonomous driving vehicle 100b may determine the travel route and driving plan based on at least one of the map data, the object information detected from the sensor information, or the object information obtained from the external device. Then, the autonomous driving vehicle 100b may move according to the determined travel path and driving plan under control of its driving unit.

The map data may include object identification information about various objects placed in a space (e.g., road) in which the autonomous driving vehicle 100b moves. For example, the map data may include object identification information about fixed objects such as street lamps, rocks, and buildings and movable objects such as vehicles and pedestrians. The object identification information may include a name, a type, a distance, a position, etc.

The autonomous driving vehicle 100b may operate and move by controlling the driving unit based on the user control/interaction. In this case, the autonomous driving vehicle 100b may obtain intention information from the motion or speech of a user and determine a response based on the obtained intention information.

<AI+XR>

When the AI technology is applied to the XR device 100c, the XR device 100c may be implemented as a HMD, a HUD mounted in vehicles, a TV, a mobile phone, a smartphone, a computer, a wearable device, a home appliance, a digital signage, a vehicle, a fixed robot, a mobile robot, etc.

The XR device 100c may analyze three-dimensional point cloud data or image data obtained from various sensors or external devices, generate position data and attribute data for three-dimensional points, obtain information about a surrounding environment or information about a real object, perform rendering to on an XR object, and then output the XR object. For example, the XR device 100c may output an XR object including information about a recognized object, that is, by matching the XR object with the recognized object.

The XR device 100c may perform the above-described operations based on a learning model configured with at least one ANN. For example, the XR device 100c may recognize the real object from the three-dimensional point cloud data or image data based on the learning model and provide information corresponding to the recognized real object. The learning model may be directly trained by the XR device 100c or an external device such as the AI server 200.

The XR device 100c may operate by directly generating a result based on the learning model. Alternatively, the XR device 100c may transmit sensor information to the external device such as the AI server 200 and receive a result generated based on the sensor information.

<AI+Robot+Autonomous Driving>

When the AI technology and the autonomous driving technology are applied to the robot 100a, the robot 100a may be implemented as a guide robot, a transport robot, a cleaning robot, a wearable robot, an entertainment robot, a pet robot, an unmanned flying robot, etc.

The robot 100a to which the AI technology and the autonomous driving technology are applied may refer to the robot 100a with the autonomous driving function or the robot 100a interacting with the autonomous driving vehicle 100b.

The robot 100a having the autonomous driving function may be collectively referred to as a device that move along a given movement path without human control or a device that moves by autonomously determining its movement path.

The robot 100a having the autonomous driving function and the autonomous driving vehicle 100b may use a common sensing method to determine either a travel route or a driving plan. For example, the robot 100a having the autonomous driving function and the autonomous driving vehicle 100b may determine either the travel route or the driving plan based on information sensed through a LIDAR, a radar, and a camera.

The robot 100a interacting with the autonomous driving vehicle 100b may exist separately from with the autonomous driving vehicle 100b. That is, the robot 100a may perform operations associated with the autonomous driving function inside or outside the autonomous driving vehicle 100b or interwork with a user on the autonomous driving vehicle 100b.

The robot 100a interacting with the autonomous driving vehicle 100b may control or assist the autonomous driving function of the autonomous driving vehicle 100b by obtaining sensor information on behalf of the autonomous driving vehicle 100b and providing the sensor information to the autonomous driving vehicle 100b or by obtaining sensor information, generating environment information or object information, and providing the information to the autonomous driving vehicle 100b.

Alternatively, the robot 100a interacting with the autonomous driving vehicle 100b may monitor the user on the autonomous driving vehicle 100b or control the autonomous driving vehicle 100b through the interaction with the user. For example, when it is determined that the driver is in a drowsy state, the robot 100a may activate the autonomous driving function of the autonomous driving vehicle 100b or assist the control of the driving unit of the autonomous driving vehicle 100b. The function of the autonomous driving vehicle 100b controlled by the robot 100a may include not only the autonomous driving function but also functions installed in the navigation system or audio system provided in the autonomous driving vehicle 100b.

Alternatively, the robot 100a interacting with the autonomous driving vehicle 100b may provide information to the autonomous driving vehicle 100b outside the autonomous driving vehicle 100b or assist the autonomous driving vehicle 100b outside the autonomous driving vehicle 100b. For example, the robot 100a may provide traffic information including signal information such as smart traffic lights to the autonomous driving vehicle 100b or automatically connect an electric charger to a charging port by interacting with the autonomous driving vehicle 100b like an automatic electric charger installed in an electric vehicle.

<AI+Robot+XR>

When the AI technology and the XR technology are applied to the robot 100a, the robot 100a may be implemented as a guide robot, a transport robot, a cleaning robot, a wearable robot, an entertainment robot, a pet robot, an unmanned flying robot, a drone, etc.

The robot 100a to which the XR technology is applied may refer to a robot subjected to control/interaction in an XR image. In this case, the robot 100a may be separated from the XR device 100c but interact with the XR device 100c.

When the robot 100a subjected to control/interaction in the XR image obtains sensor information from sensors including a camera, the robot 100a or XR device 100c may generate the XR image based on the sensor information, and then the XR device 100c may output the generated XR image. The robot 100a may operate based on a control signal input through the XR device 100c or user interaction.

For example, a user may confirm the XR image corresponding to the perspective of the robot 100a remotely controlled through an external device such as the XR device 100c. Then, the user may adjust the autonomous driving path of the robot 100a or control the operation or movement of the robot 100a through interaction therewith or check information about surrounding objects.

<AI+Autonomous Driving+XR>

When the AI technology and the XR technology is applied to the autonomous driving vehicle 100b, the autonomous driving vehicle 100b may be implemented as a mobile robot, a vehicle, an unmanned flying vehicle, etc.

The autonomous driving vehicle 100b to which the XR technology is applied may refer to an autonomous driving vehicle capable of providing an XR image or an autonomous driving vehicle subjected to control/interaction in an XR image. In particular, the autonomous driving vehicle 100b subjected to control/interaction in the XR image may be separated from the XR device 100c but interact with the XR device 100c.

The autonomous driving vehicle 100b capable of providing the XR image may obtain sensor information from sensors including a camera and output the generated XR image based on the obtained sensor information. For example, the autonomous driving vehicle 100b may include an HUD for outputting an XR image, thereby providing a user with an XR object corresponding to an object in the screen together with a real object.

When the XR object is displayed on the HUD, at least part of the XR object may overlap with the real object which the user looks at. On the other hand, when the XR object is displayed on a display provided in the autonomous driving vehicle 100b, at least part of the XR object may overlap with the object in the screen. For example, the autonomous driving vehicle 100b may output XR objects corresponding to objects such as a lane, another vehicle, a traffic light, a traffic sign, a two-wheeled vehicle, a pedestrian, a building, etc.

When the autonomous driving vehicle 100b subjected to control/interaction in the XR image may obtain the sensor information from the sensors including the camera; the autonomous driving vehicle 100b or the XR device 100c may generate the XR image based on the sensor information, and then the XR device 100c may output the generated XR image. The autonomous driving vehicle 100b may operate based on a control signal input through an external device such as the XR device 100c or user interaction.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious.to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'mobile station (MS)', 'mobile subscriber station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the method of transmitting and receiving a downlink signal and device therefor have been described based on the 5G NR system, the method and device are applicable to various wireless communication systems as well as the 5G NR system.

The invention claimed is:

1. A method of receiving a downlink signal by a user equipment (UE) in a wireless communication system, the method comprising:

receiving, through higher layer, (i) first information informing a repetition mode related to a channel state information reference signal (CSI-RS) and (ii) second information related to a starting Resource Block (RB) of a Bandwidth for the CSI-RS;

receiving, through a Control Resource Set (CORESET), (i) scheduling information related to an orthogonal frequency division multiplexing (OFDM) symbol of a physical downlink shared channel (PDSCH) and (ii) a transmission configuration indication (TCI) for the PDSCH, wherein the TCI includes CSI-RS resource identification (ID) for the CSI-RS;

receiving, based on the repetition mode being set to 'ON', the CSI-RS in at least one OFDM symbol different from an OFDM symbol which the CORESET is monitored; and receiving, based on (i) the repetition mode being set to 'OFF' and (ii) the TCI, the CSI-RS and the PDSCH in at least one same OFDM symbol, wherein, based on (i) an index of the starting RB being greater than an index of a starting RB of a Bandwidth Part (BWP) for the CSI-RS and (ii) a value obtained by subtracting the index of the starting RB from an index of a highest RB of the BWP being less than a specific value, an initial Common Resource Block (CRB) index for the CSI-RS is the index of a starting RB of the BWP for the CSI-RS.

2. The method of claim 1, wherein the CSI-RS resource ID is related to a CSI-RS resource of a CSI-RS resource set associated with the repetition mode.

3. The method of claim 1, wherein the PDSCH is received based on a reception beam for receiving the CSI-RS.

4. The method of claim 1, wherein the repetition mode is related to no beam sweeping performed by the UE.

5. The method of claim 1, wherein the UE communicates with at least one of a UE other than the UE, a base station, a network, or an autonomous driving vehicle.

6. A device for receiving a downlink signal in a wireless communication system, the device comprising:

at least one processor; and at least one memory operably connectable to the at least one processor and storing instructions that, when executed, cause the at least one processor to perform operations comprising:

receiving, through higher layer, (i) first information informing a repetition mode related to a channel state information reference signal (CSI-RS) and (ii) second information related to a starting Resource Block (RB) of a Bandwidth for the CSI-RS;

receiving, through a Control Resource Set (CORESET), (i) scheduling information related to an orthogonal frequency division multiplexing (OFDM) symbol of a physical downlink shared channel (PDSCH) and (ii) a transmission configuration indication (TCI) for the PDSCH, wherein the TCI includes CSI-RS resource identification (ID) for the CSI-RS;

receiving, based on the repetition mode being set to 'ON', the CSI-RS in at least one OFDM symbol different from an OFDM symbol which the CORESET is monitored; and receiving, based on (i) the repetition mode being set to 'OFF' and (ii) the TCI, the CSI-RS and the PDSCH in at least one same OFDM symbol, wherein, based on (i) an index of the starting RB being greater than an index of a starting RB of a Bandwidth Part (BWP) for the CSI-RS and (ii) a value obtained by subtracting the index of the starting RB from an index of a highest RB of the BWP being less than a specific value, an initial Common Resource Block (CRB) index for the CSI-RS is the index of a starting RB of the BWP for the CSI-RS.

7. The device of claim 6, wherein the CSI-RS resource ID is related to a CSI-RS resource of a CSI-RS resource set associated with the repetition mode.

8. The device of claim 6, wherein the PDSCH is received based on a reception beam for receiving the CSI-RS.

9. The device of claim 6, wherein the repetition mode is related to no beam sweeping performed by the UE.

10. The device of claim 6, wherein the device communicates with at least one of a user equipment (UE), a base station, a network, or an autonomous driving vehicle.

11. A user equipment (UE) for receiving a downlink signal in a wireless communication system, the UE comprising:
- at least one transceiver;
- at least one processor; and
- at least one memory operably connectable to the at least one processor and storing instructions that, when executed, cause the at least one processor to perform operations comprising:
- receiving, through higher layer and the at least one transceiver, (i) first information informing a repetition mode related to a channel state information reference signal (CSI-RS) and (ii) second information related to a starting Resource Block (RB) of a Bandwidth for the CSI-RS;
- receiving, through a Control Resource Set (CORESET), (i) scheduling information related to an orthogonal frequency division multiplexing (OFDM) symbol of a physical downlink shared channel (PDSCH) and (ii) a transmission configuration indication (TCI) for the PDSCH, wherein the TCI includes CSI-RS resource identification (ID) for the CSI-RS;
- receiving, based on the repetition mode being set to 'ON', the CSI-RS in at least one OFDM symbol different from an OFDM symbol which the CORESET is monitored; and
- receiving, based on (i) the repetition mode being set to 'OFF' and (ii) the TCI, the CSI-RS and the PDSCH in at least one same OFDM symbol,
- wherein, based on (i) an index of the starting RB being greater than an index of a starting RB of a Bandwidth Part (BWP) for the CSI-RS and (ii) a value obtained by subtracting the index of the starting RB from an index of a highest RB of the BWP being less than a specific value, an initial Common Resource Block (CRB) index for the CSI-RS is the index of a starting RB of the BWP for the CSI-RS.

* * * * *